(12) United States Patent
Wray et al.

(10) Patent No.: US 12,448,007 B2
(45) Date of Patent: Oct. 21, 2025

(54) IMITATION LEARNING FOR TRAJECTORY PLANNING

(71) Applicant: Nissan North America, Inc., Franklin, TN (US)

(72) Inventors: Kyle Hollins Wray, Fremont, CA (US); Christopher Ostafew, Mountain View, CA (US)

(73) Assignee: Nissan North America, Inc., Franklin, TN (US)

( * ) Notice: Subject to any disclaimer, the term of this patent is extended or adjusted under 35 U.S.C. 154(b) by 267 days.

(21) Appl. No.: 18/060,316

(22) Filed: Nov. 30, 2022

(65) Prior Publication Data
US 2024/0174264 A1    May 30, 2024

(51) Int. Cl.
| | | |
|---|---|---|
| *B60W 60/00* | (2020.01) | |
| *B60W 30/09* | (2012.01) | |
| *B60W 30/14* | (2006.01) | |
| *B60K 35/28* | (2024.01) | |

(52) U.S. Cl.
CPC ........ *B60W 60/0027* (2020.02); *B60W 30/09* (2013.01); *B60W 30/143* (2013.01); *B60K 35/28* (2024.01); *B60K 2360/175* (2024.01); *B60W 2556/45* (2020.02)

(58) Field of Classification Search
CPC ............ B60W 60/0027; B60W 30/09; B60W 30/143; B60W 2556/45; B60W 2554/20; B60W 2554/40; B60W 2556/05; B60W 2556/10; B60W 2556/50; B60W 2720/10; B60W 2754/20; B60W 2754/30; B60W 60/001; B60K 35/28; B60K 2360/175
See application file for complete search history.

(56) References Cited

U.S. PATENT DOCUMENTS

| | | | |
|---|---|---|---|
| 11,648,962 B1* | 5/2023 | Crego | G08G 1/166 |
| | | | 701/26 |
| 2018/0120843 A1 | 5/2018 | Berntorp et al. | |
| 2018/0284263 A1* | 10/2018 | Cornic | G05D 1/0669 |
| 2020/0348676 A1 | 11/2020 | Zhou et al. | |
| 2020/0377090 A1* | 12/2020 | Seccamonte | B60W 60/0011 |
| 2021/0089039 A1* | 3/2021 | Schultz | B60W 60/0011 |
| 2021/0200212 A1* | 7/2021 | Urtasun | G05D 1/0214 |
| 2022/0250644 A1* | 8/2022 | Larsson | B60W 60/0015 |

FOREIGN PATENT DOCUMENTS

| | | |
|---|---|---|
| EP | 3 474 190 A1 | 4/2019 |
| EP | 3 588 226 A1 | 1/2020 |

OTHER PUBLICATIONS

Matt Vitelli et al: "SafetyNet: Safe 1-20 planning for real-world self-driving vehicles using machine-learned policies", arxiv.org, Cornell University Library, 201 Olin Library Cornell University Ithaca, NY 14853, Sep. 28, 2021 (Sep. 28, 2021).

* cited by examiner

*Primary Examiner* — Behrang Badii
(74) *Attorney, Agent, or Firm* — Young Basile Hanlon & MacFarlane, P.C.

(57) ABSTRACT

Trajectory planning include identifying state data based on sensor data from sensors of a vehicle. The state data are input to a machine-learning model to obtain parameters of a trajectory planner. The parameters are input to the trajectory planner to obtain a short term speed plan. The vehicle is autonomously controlled according to at least a portion of the short term speed plan.

14 Claims, 11 Drawing Sheets

IMITATION LEARNING FOR TRAJECTORY PLANNING

TECHNICAL FIELD

This application relates to autonomous vehicles, including methods, apparatuses, systems, and non-transitory computer-readable media for trajectory planning using learned parameters.

SUMMARY

Disclosed herein are aspects, features, elements, and implementations for remote support of autonomous operation of a vehicle. The implementations support remote operation that extends an existing route to an alternative end point at a destination.

A first aspect of the disclosed implementations is a method for trajectory planning. The method includes identifying state data based on sensor data from sensors of a vehicle; inputting the state data to a machine-learning model to obtain parameters of a trajectory planner; inputting the parameters to the trajectory planner to obtain a short term speed plan; and autonomously controlling the vehicle according to at least a portion of the short term speed plan.

A second aspect of the disclosed implementations is a device for trajectory planning. The device includes a processor and a memory. The processor is configured to execute instructions stored in the memory to identify state data based on sensor data from sensors of a vehicle; input the state data to a machine-learning model to obtain parameters of a trajectory planner; input the parameters to the trajectory planner to obtain a short term speed plan; and autonomously control the vehicle according to at least a portion of the short term speed plan.

A third aspect of the disclosed implementations is a non-transitory computer-readable storage medium that includes executable instructions that, when executed by a processor, facilitate performance of operations that include identifying state data based on sensor data from sensors of a vehicle; inputting the state data to a machine-learning model to obtain parameters of a trajectory planner; inputting the parameters to the trajectory planner to obtain a short term speed plan; and autonomously controlling the vehicle according to at least a portion of the short term speed plan.

These and other aspects of the present disclosure are disclosed in the following detailed description of the embodiments, the appended claims and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings may not be to scale. On the contrary, the dimensions of the various features may be arbitrarily expanded or reduced for clarity. Further, like reference numbers refer to like elements throughout the drawings unless otherwise noted.

DETAILED DESCRIPTION

Figure 1:
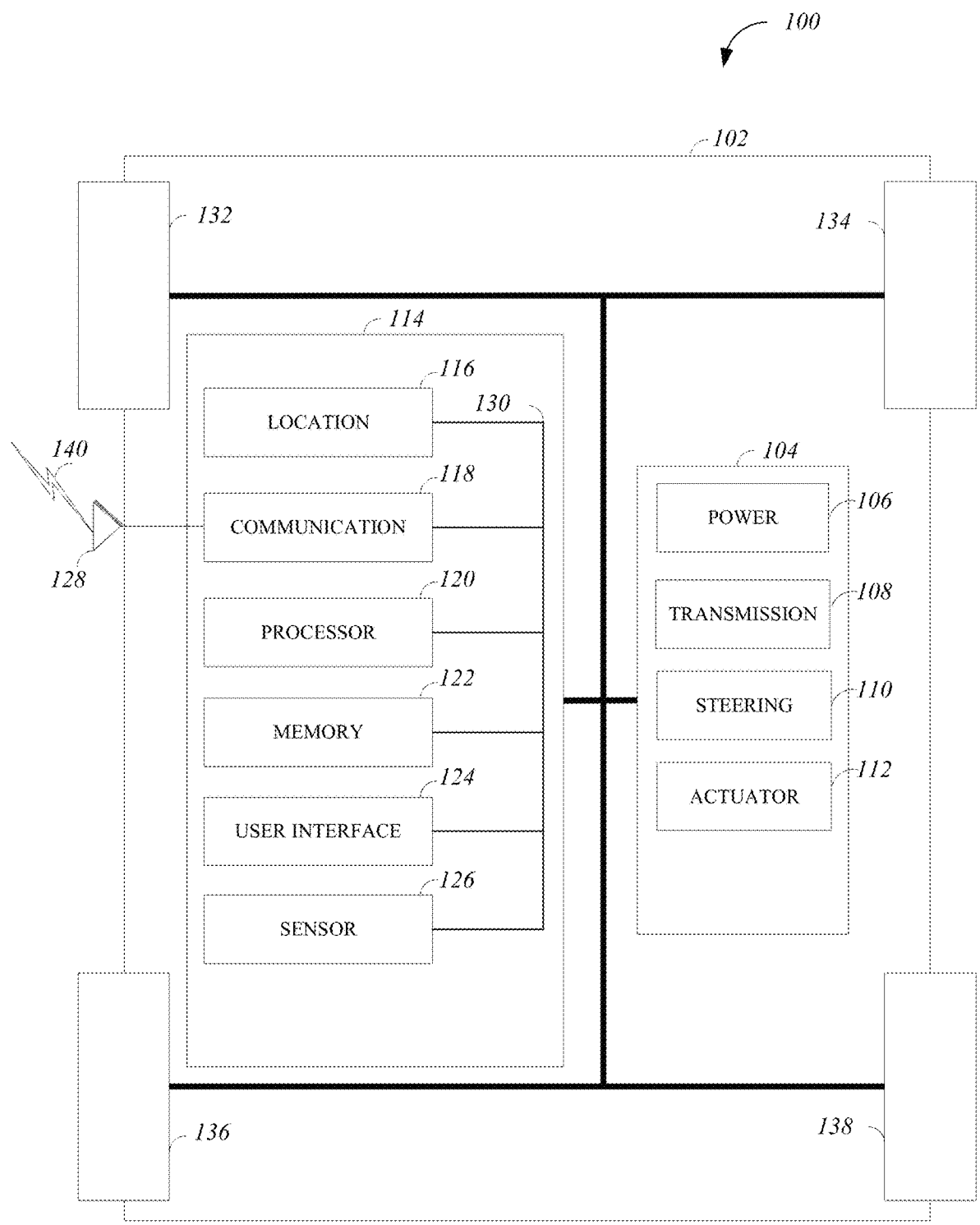
FIG. 1 is a diagram of an example of a portion of a vehicle in which the aspects, features, and elements disclosed herein may be implemented.

A vehicle, such as an autonomous vehicle or a semi-autonomous vehicle, may traverse a portion of a vehicle transportation network. The vehicle transportation network can include one or more unnavigable areas, such as a building; one or more partially navigable areas, such as a parking area (e.g., a parking lot, a parking space, etc.); one or more navigable areas, such as roads (which include lanes, medians, intersections, etc.); or a combination thereof.

The vehicle may include one or more sensors. Traversing the vehicle transportation network may include the sensors generating or capturing sensor data, such as data corresponding to an operational environment of the vehicle, or a portion thereof. For example, the sensor data may include information corresponding to one or more external objects (or simply, objects).

An external object can be a static object. A static object is one that is stationary and is not expected to move in the next few seconds. Examples of static objects include a bike with no rider, a cold vehicle, an empty vehicle, a road sign, a wall, a building, a pothole, etc. An external object can be a stopped object. A stopped object is one that is stationary but might move at any time. Examples of stopped objects include a vehicle that is stopped at a traffic light and a vehicle on the side of the road with an occupant (e.g., a driver) therein. Stopped objects may be considered to be static objects. An external object can be a dynamic (i.e., moving) object, such as a pedestrian, a remote vehicle, a motorcycle, a bicycle, etc. The dynamic object can be oncoming (toward the vehicle) or can be moving in the same direction as the vehicle. The dynamic object can be moving longitudinally or laterally with respect to the vehicle. A static object can become a dynamic object, and vice versa.

In general, traversing (e.g., driving within) the vehicle transportation network can be considered a robotic behavior. That is, predictable responses by a vehicle to certain situations (e.g., traffic or road situations) can be anticipated. For example, an observer of a traffic situation can anticipate what the response of a vehicle will be over the next few seconds. That is, for example, while the driving environment (i.e., the vehicle transportation network, the roadways) may be dynamic, the response, such as by a vehicle (i.e., driven by a human, remotely operated, etc.), to a road condition, can be predicted/anticipated.

The response(s) can be predicted because traversing a vehicle transportation network is governed by rules of the road (e.g., a vehicle turning left must yield to oncoming traffic, a vehicle must drive between a lane's markings), by social conventions (e.g., at a stop sign, the driver on the right is yielded to), and physical limitations (e.g., a stationary object does not instantaneously move laterally into a vehicle's right of way). Additional examples of predictable responses are illustrated with respect to FIG. 3.

A trajectory for an autonomous vehicle can be determined by detecting (e.g., sensing, observing, etc.) the presence of static objects and anticipating (i.e., predicting) the trajectories of other users of the vehicle transportation network (e.g., road users, dynamic objects). Implementations according to this disclosure can accurately and efficiently plan trajectories of dynamic objects (e.g., other road users) contributing to smooth control (e.g., stop, wait, accelerate, decelerate, merge, etc.) of an autonomous vehicle and socially acceptable behavior (e.g., operations) of the autonomous vehicle.

A trajectory planner can generate a smooth trajectory for an autonomous vehicle (AV), from a source location to a destination location, by, for example, receiving HD map data, teleoperation data, and other input data; stitching (e.g., fusing, connecting, etc.) the input data longitudinally to determine a speed profile for a path from the source location to the destination location (e.g., the speed profile specifying how fast the AV can be driven along different segments of the path from the source location to the destination location); and, at discrete time points (e.g., every few milliseconds), having the trajectory planner process constraints related to static and dynamic objects, which are observed based on sensor data of the AV, to generate a smooth trajectory for the AV for the next time window (e.g., a look-ahead time of 6 seconds).

The trajectory planner can receive the anticipated (i.e., predicted) trajectories of other users of the vehicle transportation network (also referred to herein as real-world objects) from a module (e.g., a world model module). For each detected dynamic object (e.g., a real-world object, such as a vehicle, a pedestrian, a bicycle, and the like), the world model module can maintain (e.g., predict and update) one or more hypothesis regarding the possible intentions of the real-world object. Examples of intentions (e.g., hypotheses) include stop, turn right, turn left, go straight, pass, and park. A likelihood is associated with each hypothesis. The likelihood is updated based on observations received from sensor data.

The real-world objects can be detected based on received sensor data (also referred to herein as measurements or sensor observations). A world model module may maintain (i.e., associate and update over time) a state for each hypothesis (e.g., intention) associated with a real-world object. States are further described below. For example, the state includes predicted locations of the associated real-world object given the intention of a hypothesis.

The world model module continuously receives observations (e.g., sensor data). For a given observation, the world model module determines the real-world object that the observation is associated with. If an associated real-world object is found, then the state of each of the hypotheses associated with real-world object are updated based on the observation. That is, for example, the predicted location of the real-world object is updated based on the observation received from the real (e.g., physical) world.

It is noted that sensor observations can be noisy. The noise can be due to limitations of the sensing capabilities and/or sensor setup. For example, sensors may have limited fields of view, have limited sensing ranges, provide false positive and/or false negative readings, provide observations with large uncertainties, and/or provide erroneous object classifications. Also, different sensor types used by the autonomous vehicle may provide different, partial, and/or conflicting observations (e.g., classifications, locations, etc.). As such, a level of uncertainty can be associated with the sensor data received by the world model module.

An autonomous vehicle can use (e.g., fuse) data from the multiple types of sensors (e.g., cameras, LiDAR, radar, etc.) to estimate at least one of a velocity, a pose (position and heading), a trajectory, a class, and the like of a real-world object that is external to the autonomous vehicle. A world model module, can provide the best estimation of current statuses of real-world objects (i.e., road users) by fusing information from multiple sensors together and taking sensor characteristics into consideration.

A trajectory planner may determine (e.g., calculate, compute, or select) a trajectory subject to predefined constraints or parameters. The number of the parameters may be in the 10s, 100s or even more. To illustrate, one such parameter may be the target time headway. The target time headway represents a time between a front end of a vehicle and a back end of a leading vehicle that the vehicle is following. The headway data may be measured in units of distance (e.g., meters). The time headway for a vehicle, or time gap, can be calculated based upon the vehicle speed and the trailing distance from the leading vehicle. The trajectory planner may receive, as input, a desired (predefined) value for the target time headway (e.g., 2 seconds) and calculate a short term speed plan using the target time headway. Another example of such parameters is a stop line offset parameter. Given a stop line (e.g., a line that the vehicle is to stop at), the trajectory planner may not cause the front end of the vehicle to stop on top of the stop line; rather, the trajectory planner causes the vehicle to stop at a distance from the stop line that is given by the stop line offset parameter. Another such parameter may be target acceleration, which may indicate the maximum rate of acceleration (e.g., 2 meters per second squared) from a standstill position.

Many such parameters that the trajectory planner uses are typically fixed and non-adaptive. The values for these parameters may be hand-tuned and preset at the factory. With respect to some parameters, an occupant of the vehicle may be able to select one of several predefined values. To illustrate, an occupant may be able to select from amongst the values 1 second, 1.5 seconds, or 3 seconds for the target time headway. Nonetheless, selection from amongst preconfigured values is also considered fixed and non-adaptive.

Fixed and non-adaptive parameter result in a non-adaptive trajectory plans that cannot adapt to customer (e.g., occupant) preferences. To illustrate, different customers (e.g., passengers or occupants) may prefer driving styles that differ in how close the vehicle gets to other vehicles, what accelerations are tolerable, how aggressively to make a lane change or merge, how fast to accelerate after a traffic light or stop sign, how to adapt such parameters based on location (city vs. rural, countries, or cultures), and so on.

A trajectory planner can be thought of as a function $f$ that computes, for a planning window, a trajectory (e.g., a short term speed plan) given a current state x as detected using sensor data and/or as maintained in the world model module and using a set of parameters θ. The planning window can be, for example, 1 second, 10 seconds, or some other planning window. The trajectory planner may be executed several times (e.g., 100s of times) per second. The trajectory can be or include a set of positions (e.g., poses) and speeds for different discrete locations (e.g., time steps) of the planning window. Symbolically, the trajectory planner can be given by $f(x; \theta)$. To reiterate, in this formulation, the trajectory planner uses fixed, non-adaptive parameters $\theta$ in its computation (e.g., optimization) process (i.e., to obtain the short term trajectory).

However, having fixed parameter values may not result in the most optimal drive or ride experience in at least partial autonomous driving (i.e., autonomous vehicles and semi-autonomous vehicles that include driver-assist functions such as lane assist or adaptive cruise control). To illustrate, in New York City, drivers may prefer to accelerate at higher rate on weekdays; whereas drivers in New York City, on Sundays, and in rural areas, may prefer to accelerate at a lower rate. That is, different customers prefer different driving styles (e.g., what accelerations are tolerable). As such, a fixed parameter governing the acceleration rate may not satisfy such diverse preferences. To generalize, at least some of the parameters used by a trajectory planner should preferably be adaptable, such as based on location, occupant preferences, or other criteria.

In implementations according to this disclosure, imitation learning for trajectory planning can be used to learn at least some parameters of a trajectory planner. The parameters can be learned from driving data that include state data. A machine-learning (ML) model can be trained to map state data to parameter values. The ML model may be a deep neural network (DNN), a regression model, simple linear regression model, support vector machine (SVN), or some other suitable ML model that can be trained to output parameters usable by a trajectory planner. The trajectory planner can then dynamically select (e.g., obtain from the trained machine learning model) these learned parameters given a current state. The ML model can be trained using data that are extracted from what other drivers have done in similarly observed states.

Symbolically, the trained ML model can be given by a function $g(x; \phi^*)$, where x represents the state observed by the vehicle, and $\phi^*$ represents the learned parameters of the ML model. Given a certain state x, parameters $\theta_x$ can be obtained from the ML model: $\theta_x = g(x, \phi^*)$. To be clear, $g(x; \phi^*)$ represents parameters used by the trajectory planner; and $\phi^*$ represent the parameters of the ML model (which may include, for example in the case of a neural-network-based ML model, a number of layers, a respective number of nodes in each layer, and the respective weights assigned to these nodes).

Several benefits in autonomous driving can be realized using imitation learning for trajectory planning. As mentioned, parameter selection can be dynamic and adaptable based on an observed state x. Parameter selection can be scenario-, or setting-based (e.g., urban vs. rural, dense vs. light traffic, a vehicle moving too close to the AV vs. a vehicle far from the AV, etc.). Additionally, parameter selection can be based on (e.g., customizable to) a particular customer and/or can be shared amongst customers. The parameters can be dynamically adapted to different customer preferences, cultural norms (e.g., within different cities in the same country or across different countries), or other adaption criteria.

Additionally, constraints can be placed on the parameters to be learned. To illustrate, the target time headway may be constrained to a minimum of 0.5 seconds. Such constraints during the learning process can guarantee concrete measures of safety. As contrasted with other techniques that may use machine learning to learn the trajectory planner itself (i.e., to learn the function $f(x, \theta)$ itself), learning parameters for a trajectory planner, as described herein, can be considered safer than learning the trajectory planner because the learned parameters are used by a safe, fixed, tested, optimal control $f(x; \theta_x)$, which may incorporate contingency planning and other safety features.

To describe some implementations of the teachings herein in greater detail, reference is first made to the environment in which this disclosure may be implemented. FIG. 1 is a diagram of an example of a portion of a vehicle 100 in which the aspects, features, and elements disclosed herein may be implemented. The vehicle 100 includes a chassis 102, a powertrain 104, a controller 114, wheels 132/134/136/138, and may include any other element or combination of elements of a vehicle. Although the vehicle 100 is shown as including four wheels 132/134/136/138 for simplicity, any other propulsion device or devices, such as a propeller or tread, may be used. In FIG. 1, the lines interconnecting elements, such as the powertrain 104, the controller 114, and the wheels 132/134/136/138, indicate that information, such as data or control signals, power, such as electrical power or torque, or both information and power, may be communicated between the respective elements. For example, the controller 114 may receive power from the powertrain 104 and communicate with the powertrain 104, the wheels 132/134/136/138, or both, to control the vehicle 100, which can include accelerating, decelerating, steering, or otherwise controlling the vehicle 100.

The powertrain 104 includes a power source 106, a transmission 108, a steering unit 110, a vehicle actuator 112, and may include any other element or combination of elements of a powertrain, such as a suspension, a drive shaft, axles, or an exhaust system. Although shown separately, the wheels 132/134/136/138 may be included in the powertrain 104.

The power source 106 may be any device or combination of devices operative to provide energy, such as electrical energy, thermal energy, or kinetic energy. For example, the power source 106 includes an engine, such as an internal combustion engine, an electric motor, or a combination of an internal combustion engine and an electric motor, and is operative to provide kinetic energy as a motive force to one or more of the wheels 132/134/136/138. In some embodiments, the power source 106 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 108 receives energy, such as kinetic energy, from the power source 106 and transmits the energy to the wheels 132/134/136/138 to provide a motive force. The transmission 108 may be controlled by the controller 114, the vehicle actuator 112, or both. The steering unit 110 may be controlled by the controller 114, the vehicle actuator 112, or both and controls the wheels 132/134/136/138 to steer the vehicle. The vehicle actuator 112 may receive signals from the controller 114 and may actuate or control the power source 106, the transmission 108, the steering unit 110, or any combination thereof to operate the vehicle 100.

In the illustrated embodiment, the controller 114 includes a location unit 116, an electronic communication unit 118, a processor 120, a memory 122, a user interface 124, a sensor 126, and an electronic communication interface 128. Although shown as a single unit, any one or more elements of the controller 114 may be integrated into any number of separate physical units. For example, the user interface 124 and the processor 120 may be integrated in a first physical unit, and the memory 122 may be integrated in a second physical unit. Although not shown in FIG. 1, the controller 114 may include a power source, such as a battery. Although shown as separate elements, the location unit 116, the electronic communication unit 118, the processor 120, the memory 122, the user interface 124, the sensor 126, the electronic communication interface 128, or any combination thereof can be integrated in one or more electronic units, circuits, or chips.

In some embodiments, the processor 120 includes any device or combination of devices, now-existing or hereafter developed, capable of manipulating or processing a signal or other information, for example optical processors, quantum processors, molecular processors, or a combination thereof. For example, the processor 120 may include one or more special-purpose processors, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, one or more state machines, or any combination thereof. The processor 120 may be operatively coupled with the location unit 116, the memory 122, the electronic communication interface 128, the electronic communication unit 118, the user interface 124, the sensor 126, the powertrain 104, or any combination thereof. For example, the processor may be operatively coupled with the memory 122 via a communication bus 130.

The processor 120 may be configured to execute instructions. Such instructions may include instructions for remote operation, which may be used to operate the vehicle 100 from a remote location, including the operations center. The instructions for remote operation may be stored in the vehicle 100 or received from an external source, such as a traffic management center, or server computing devices, which may include cloud-based server computing devices.

The memory 122 may include any tangible non-transitory computer-usable or computer-readable medium capable of, for example, containing, storing, communicating, or transporting machine-readable instructions or any information associated therewith, for use by or in connection with the processor 120. The memory 122 may include, for example, one or more solid state drives, one or more memory cards, one or more removable media, one or more read-only memories (ROM), one or more random-access memories (RAM), one or more registers, one or more low power double data rate (LPDDR) memories, one or more cache memories, one or more disks (including a hard disk, a floppy disk, or an optical disk), a magnetic or optical card, or any type of non-transitory media suitable for storing electronic information, or any combination thereof.

The electronic communication interface 128 may be a wireless antenna, as shown, a wired communication port, an optical communication port, or any other wired or wireless unit capable of interfacing with a wired or wireless electronic communication medium 140.

The electronic communication unit 118 may be configured to transmit or receive signals via the wired or wireless electronic communication medium 140, such as via the electronic communication interface 128. Although not explicitly shown in FIG. 1, the electronic communication unit 118 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 118 and a single one of the electronic communication interface 128, any number of communication units and any number of communication interfaces may be used. In some embodiments, the electronic communication unit 118 can include a dedicated short-range communications (DSRC) unit, a wireless safety unit (WSU), IEEE 802.11p (WiFi-P), or a combination thereof.

The location unit 116 may determine geolocation information, including but not limited to longitude, latitude, elevation, direction of travel, or speed, of the vehicle 100. For example, the location unit includes a global positioning system (GPS) unit, such as a Wide Area Augmentation System (WAAS) enabled National Marine Electronics Association (NMEA) unit, a radio triangulation unit, or a combination thereof. The location unit 116 can be used to obtain information that represents, for example, a current heading of the vehicle 100, a current position of the vehicle 100 in two or three dimensions, a current angular orientation of the vehicle 100, or a combination thereof.

The user interface 124 may include any unit capable of being used as an interface by a person, including any of a virtual keypad, a physical keypad, a touchpad, a display, a touchscreen, a speaker, a microphone, a video camera, a sensor, and a printer. The user interface 124 may be operatively coupled with the processor 120, as shown, or with any other element of the controller 114. Although shown as a single unit, the user interface 124 can include one or more physical units. For example, the user interface 124 includes an audio interface for performing audio communication with a person, and a touch display for performing visual and touch-based communication with the person.

The sensor 126 may include one or more sensors, such as an array of sensors, which may be operable to provide information that may be used to control the vehicle. The sensor 126 can provide information regarding current operating characteristics of the vehicle or its surroundings. The sensor 126 includes, for example, a speed sensor, acceleration sensors, a steering angle sensor, traction-related sensors, braking-related sensors, or any sensor, or combination of sensors, which is operable to report information regarding some aspect of the current dynamic situation of the vehicle 100.

In some embodiments, the sensor 126 includes sensors that are operable to obtain information regarding the physical environment surrounding the vehicle 100. For example, one or more sensors detect road geometry and obstacles, such as fixed obstacles, vehicles, cyclists, and pedestrians. The sensor 126 can be or include one or more video cameras, laser-sensing systems, infrared-sensing systems, acoustic-sensing systems, or any other suitable type of on-vehicle environmental sensing device, or combination of devices, now known or later developed. The sensor 126 and the location unit 116 may be combined.

Although not shown separately, the vehicle 100 may include a trajectory controller. For example, the controller 114 may include a trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller outputs signals operable to control the vehicle 100 such that the vehicle 100 follows the trajectory that is determined by the trajectory controller. For example, the output of the trajectory controller can be an optimized trajectory that may be supplied to the powertrain 104, the wheels 132/134/136/138, or both. The optimized trajectory can be a control input, such as a set of steering angles, with each steering angle corresponding to a point in time or a position. The optimized trajectory can be one or more paths, lines, curves, or a combination thereof.

One or more of the wheels 132/134/136/138 may be a steered wheel, which is pivoted to a steering angle under control of the steering unit 110; a propelled wheel, which is torqued to propel the vehicle 100 under control of the transmission 108; or a steered and propelled wheel that steers and propels the vehicle 100.

A vehicle may include units or elements not shown in FIG. 1, such as an enclosure, a Bluetooth® module, a frequency modulated (FM) radio unit, a Near-Field Communication (NFC) module, a liquid crystal display (LCD) display unit, an organic light-emitting diode (OLED) display unit, a speaker, or any combination thereof.

Figure 2:
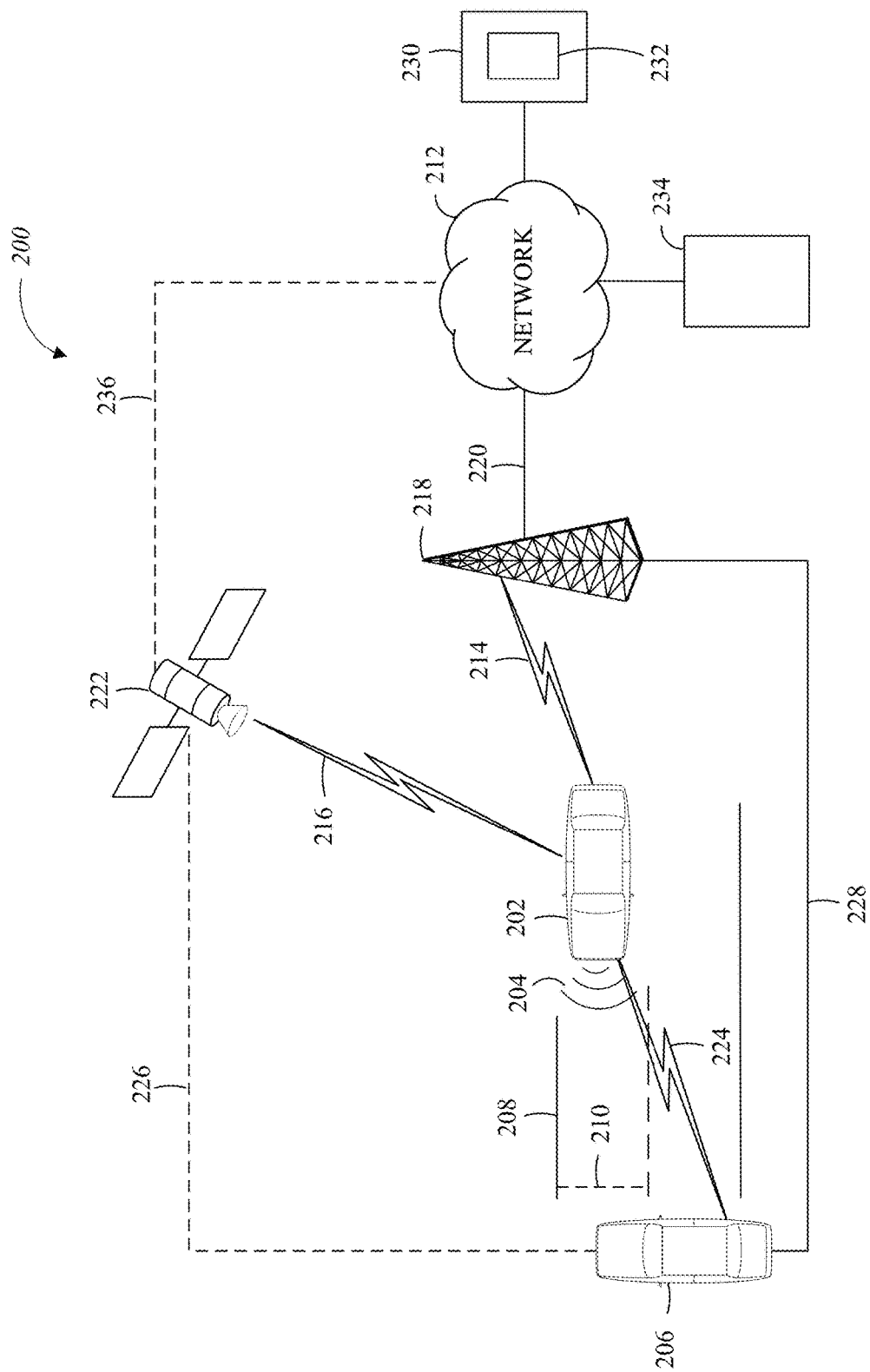
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 200 in which the aspects, features, and elements disclosed herein may be implemented. The vehicle transportation and communication system 200 includes a vehicle 202, such as the vehicle 100 shown in FIG. 1, and one or more external objects, such as an external object 206, which can include any form of transportation, such as the vehicle 100 shown in FIG. 1, a pedestrian, cyclist, as well as any form of a structure, such as a building. The vehicle 202 may travel via one or more portions of a transportation network 208, and may communicate with the external object 206 via one or more of an electronic communication network 212. Although not explicitly shown in FIG. 2, a vehicle may traverse an area that is not expressly or completely included in a transportation network, such as an off-road area. In some embodiments, the transportation network 208 may include one or more of a vehicle detection sensor 210, such as an inductive loop sensor, which may be used to detect the movement of vehicles on the transportation network 208.

The electronic communication network 212 may be a multiple access system that provides for communication, such as voice communication, data communication, video communication, messaging communication, or a combination thereof, between the vehicle 202, the external object 206, and an operations center 230. For example, the vehicle 202 or the external object 206 may receive information, such as information representing the transportation network 208, from the operations center 230 via the electronic communication network 212.

The operations center 230 includes a controller apparatus 232, which includes some or all of the features of the controller 114 shown in FIG. 1. The controller apparatus 232 can monitor and coordinate the movement of vehicles, including autonomous vehicles. The controller apparatus 232 may monitor the state or condition of vehicles, such as the vehicle 202, and external objects, such as the external object 206. The controller apparatus 232 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 232 can establish remote control over one or more vehicles, such as the vehicle 202, or external objects, such as the external object 206. In this way, the controller apparatus 232 may teleoperate the vehicles or external objects from a remote location. The controller apparatus 232 may exchange (send or receive) state data with vehicles, external objects, or a computing device, such as the vehicle 202, the external object 206, or a server computing device 234, via a wireless communication link, such as the wireless communication link 226, or a wired communication link, such as the wired communication link 228.

The server computing device 234 may include one or more server computing devices, which may exchange (send or receive) state signal data with one or more vehicles or computing devices, including the vehicle 202, the external object 206, or the operations center 230, via the electronic communication network 212. The server computing device 234 can be or have a configuration that is similar to that of the computing device 1100 of FIG. 11.

In some embodiments, the vehicle 202 or the external object 206 communicates via the wired communication link 228, a wireless communication link 214/216/224, or a combination of any number or types of wired or wireless communication links. For example, as shown, the vehicle 202 or the external object 206 communicates via a terrestrial wireless communication link 214, via a non-terrestrial wireless communication link 216, or via a combination thereof. In some implementations, a terrestrial wireless communication link 214 includes an Ethernet link, a serial link, a Bluetooth link, an infrared (IR) link, an ultraviolet (UV) link, or any link capable of electronic communication.

A vehicle, such as the vehicle 202, or an external object, such as the external object 206, may communicate with another vehicle, external object, or the operations center 230. For example, a host, or subject, vehicle 202 may receive one or more automated inter-vehicle messages, such as a basic safety message (BSM), from the operations center 230 via a direct communication link 224 or via an electronic communication network 212. For example, the operations center 230 may broadcast the message to host vehicles within a defined broadcast range, such as three hundred meters, or to a defined geographical area. In some embodiments, the vehicle 202 receives a message via a third party, such as a signal repeater (not shown) or another remote vehicle (not shown). In some embodiments, the vehicle 202 or the external object 206 transmits one or more automated inter-vehicle messages periodically based on a defined interval, such as one hundred milliseconds.

The vehicle 202 may communicate with the electronic communication network 212 via an access point 218. The access point 218, which may include a computing device, is configured to communicate with the vehicle 202, with the electronic communication network 212, with the operations center 230, or with a combination thereof via wired or wireless communication links 214/220. For example, an access point 218 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 202 may communicate with the electronic communication network 212 via a satellite 222 or other non-terrestrial communication device. The satellite 222, which may include a computing device, may be configured to communicate with the vehicle 202, with the electronic communication network 212, with the operations center 230, or with a combination thereof via one or more communication links 216/236. Although shown as a single unit, a satellite can include any number of interconnected elements.

The electronic communication network 212 may be any type of network configured to provide for voice, data, or any other type of electronic communication. For example, the electronic communication network 212 includes a local area network (LAN), a wide area network (WAN), a virtual private network (VPN), a mobile or cellular telephone network, the Internet, or any other electronic communication system. The electronic communication network 212 may use a communication protocol, such as the Transmission Control Protocol (TCP), the User Datagram Protocol (UDP), the Internet Protocol (IP), the Real-time Transport Protocol (RTP), the Hyper Text Transport Protocol (HTTP), or a combination thereof. Although shown as a single unit, an electronic communication network can include any number of interconnected elements.

In some embodiments, the vehicle 202 communicates with the operations center 230 via the electronic communication network 212, access point 218, or satellite 222. The operations center 230 may include one or more computing devices, which are able to exchange (send or receive) data from a vehicle, such as the vehicle 202; data from external objects, including the external object 206; or data from a computing device, such as the server computing device 234.

In some embodiments, the vehicle 202 identifies a portion or condition of the transportation network 208. For example, the vehicle 202 may include one or more on-vehicle sensors 204, such as the sensor 126 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 208.

The vehicle 202 may traverse one or more portions of the transportation network 208 using information communicated via the electronic communication network 212, such as information representing the transportation network 208, information identified by one or more on-vehicle sensors 204, or a combination thereof. The external object 206 may be capable of all or some of the communications and actions described above with respect to the vehicle 202.

For simplicity, FIG. 2 shows the vehicle 202 as the host vehicle, the external object 206, the transportation network 208, the electronic communication network 212, and the operations center 230. However, any number of vehicles, networks, or computing devices may be used. In some embodiments, the vehicle transportation and communication system 200 includes devices, units, or elements not shown in FIG. 2.

Although the vehicle 202 is shown communicating with the operations center 230 via the electronic communication network 212, the vehicle 202 (and the external object 206) may communicate with the operations center 230 via any number of direct or indirect communication links. For example, the vehicle 202 or the external object 206 may communicate with the operations center 230 via a direct communication link, such as a Bluetooth communication link. Although, for simplicity, FIG. 2 shows one of the transportation network 208 and one of the electronic communication network 212, any number of networks or communication devices may be used.

The external object 206 is illustrated as a second, remote vehicle in FIG. 2. An external object is not limited to another vehicle. An external object may be any infrastructure element, for example, a fence, a sign, a building, etc., that has the ability transmit data to the operations center 230. The data may be, for example, sensor data from the infrastructure element.

Figure 3:
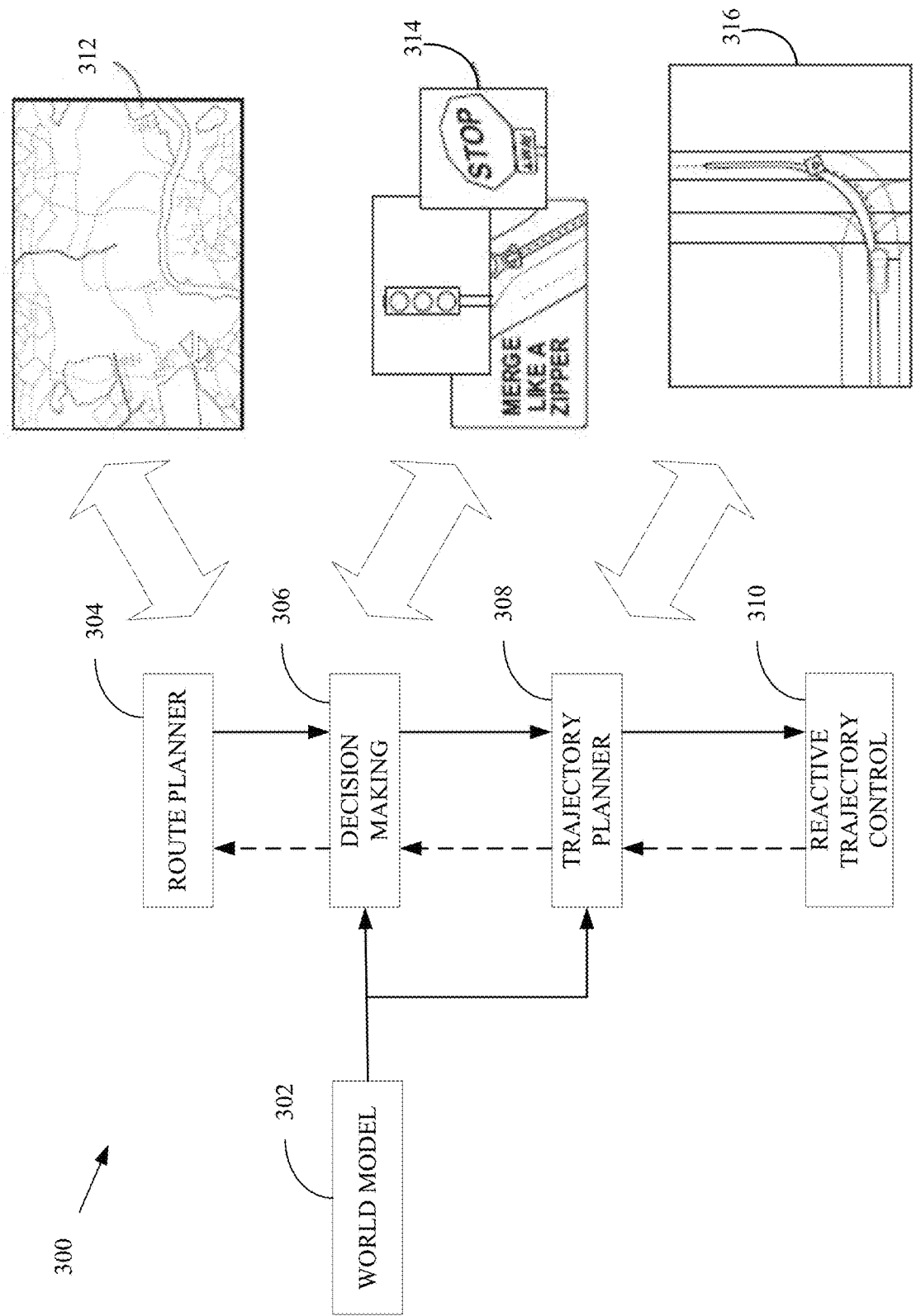
FIG. 3 is an example of components of a system for an autonomous vehicle.

FIG. 3 is an example of components of a system 300 for an autonomous vehicle. The system 300 represents a software pipeline of an autonomous vehicle, such as the vehicle 100 of FIG. 1. The system 300 includes a world model module 302, a route planning module 304, a decision making module 306, a trajectory planner 308, and a reactive trajectory control module 310. Other examples of the system 300 can include more, fewer, or other modules. In some examples, the modules can be combined; in other examples, a module can be divided into one or more other modules.

The world model module 302 receives sensor data, such as from the sensor 126 of FIG. 1, and determines (e.g., converts to, detects, etc.) objects from the sensor data. That is, for example, the world model module 302 determines the road users from the received sensor data. For example, the world model module 302 can convert a point cloud received from a light detection and ranging (LiDAR) sensor (i.e., a sensor of the sensor 126) into an object. Sensor data from several sensors can be fused together to determine (e.g., guess the identity of) the objects. Examples of objects include a bicycle, a pedestrian, a vehicle, etc.

The world model module 302 can receive sensor information that allows the world model module 302 to calculate and maintain additional information for at least some of the detected objects. For example, the world model module 302 can maintain a state for at least some of the determined objects. For example, the state for an object can include zero or more of a velocity, a pose, a geometry (such as width, height, and depth), a classification (e.g., bicycle, large truck, pedestrian, road sign, etc.), and a location. As such, the state of an object includes discrete state information (e.g., classification) and continuous state information (e.g., pose and velocity).

The world model module 302 fuses sensor information, tracks objects, maintains lists of hypotheses for at least some of the dynamic objects (e.g., an object A might be going straight, turning right, or turning left), creates and maintains predicted trajectories for each hypothesis, and maintains likelihood estimates of each hypothesis (e.g., object A is going straight with probability 90% considering the object pose/velocity and the trajectory poses/velocities). In an example, the world model module 302 uses an instance of the trajectory planner, which generates a reference driveline for each object hypothesis for at least some of the dynamic objects. For example, one or more instances of the trajectory planner can be used to generate reference drivelines for vehicles, bicycles, and pedestrians. In another example, an instance of the trajectory planner can be used to generate reference drivelines for vehicles and bicycles, and a different method can be used to generate reference drivelines (e.g., references paths) for pedestrians.

The objects maintained by the world model module 302 can include static objects and/or dynamic objects.

The route planning module 304 determines a road-level plan, such as illustrated with respect to a road-level plan 312. For example, given a starting location and a destination location, the route planning module 304 determines a route from the starting location to the destination location. For example, the route planning module 304 can determine the list of roads (i.e., the road-level plan) to be followed by the AV to navigate from the starting location to the destination location.

The road-level plan determined by the route planning module 304 and the objects (and corresponding state information) maintained by the world model module 302 can be used by the decision making module 306 to determine discrete-level decisions along the road-level plan. An example of decisions included in the discrete-level decisions is illustrated with respect to discrete decisions 314. An example of discrete-level decisions may include: stop at the interaction between road A and road B, move forward slowly, accelerate to a certain speed limit, merge onto the rightmost lane, etc.

The trajectory planner 308 can receive the discrete-level decisions, the objects (and corresponding state information) maintained by the world model module 302, and the predicted trajectories and likelihoods of the external objects from the world model module 302. The trajectory planner 308 can use at least some of the received information to determine a detailed-planned trajectory for the autonomous vehicle.

For example, as illustrated with respect to a detailed-planned trajectory 316, the trajectory planner 308 determines a next-few-seconds trajectory. As such, and in an example where the next few seconds are the next 6 seconds (i.e., a look-ahead time of 6 seconds), the trajectory planner 308 determines a trajectory and locations for the autonomous vehicle in the next 6 seconds. For example, the trajectory planner 308 may determine (e.g., predict, calculate, etc.) the expected locations of the autonomous vehicle at several time intervals (e.g., every one-quarter of a second, or some other time intervals). The trajectory planner 308 can determine the detailed-planned trajectory based on predictable responses of other road users.

The reactive trajectory control module 310 can handle situations that the autonomous vehicle may encounter but are unpredictable (e.g., cannot be handled) by the trajectory planner 308. Such situations include situations where the detailed-planned trajectory of the trajectory planner 308 was based on misclassification of objects and/or unanticipated situations that rarely occur. For example, the reactive trajectory control module 310 can modify the detailed-planned trajectory in response to determining that the static object to the left of the autonomous vehicle is misclassified. For example, the object may have been classified as a large truck; however, a new classification determines that it is a static road barrier wall. In another example, the reactive trajectory control module 310 can modify the detailed-planned trajectory in response to a sudden tire blowout of the autonomous vehicle. Other examples of unanticipated situations include other vehicles swerving suddenly (e.g., due to late decision to get to highway off-ramp or tire blowout) into the lane of the AV and pedestrians or other objects emerging suddenly from behind occlusions.

Figure 4:
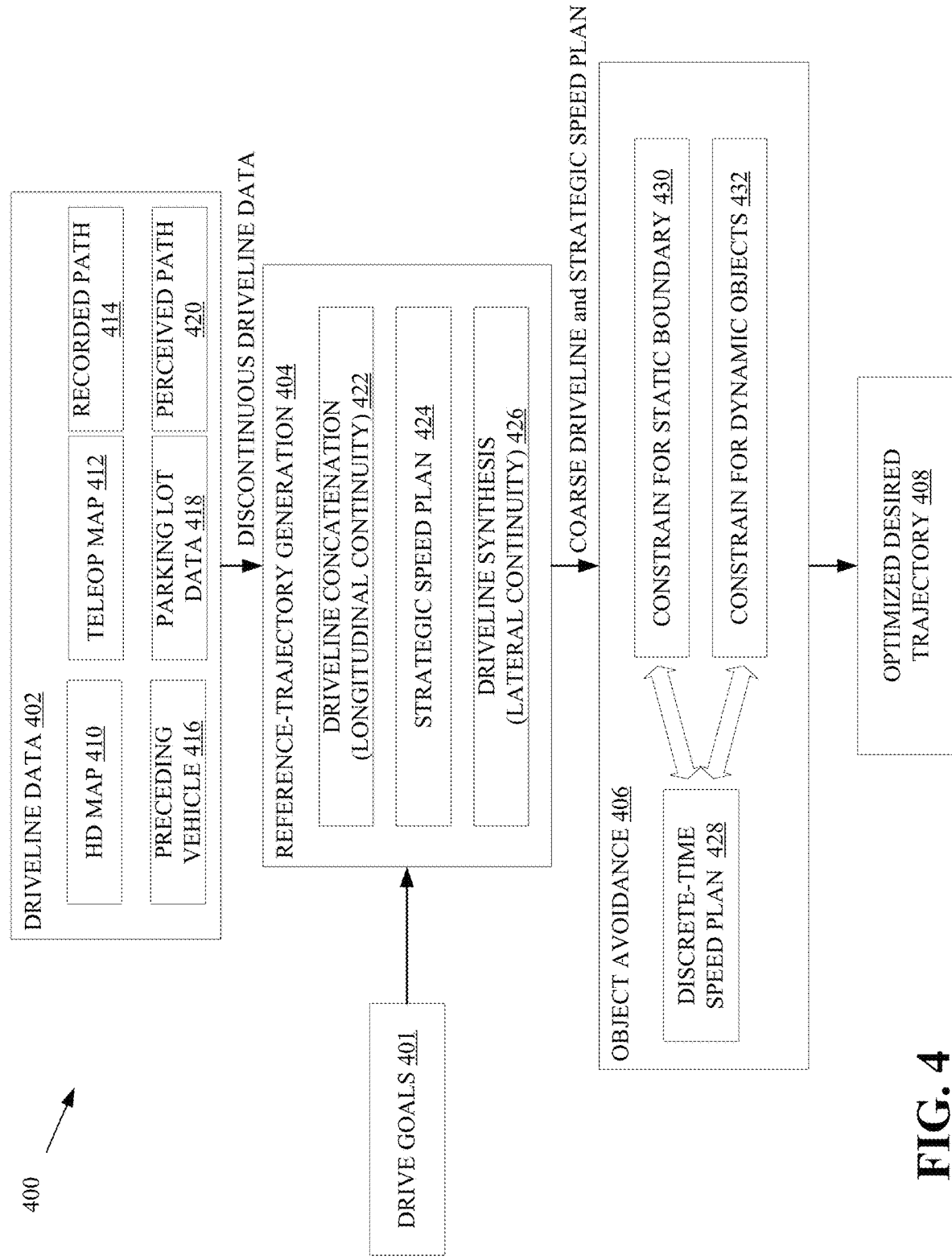
FIG. 4 is an example of layers of a trajectory planner for an autonomous vehicle.

FIG. 4 is an example of layers of a trajectory planner 400 for an autonomous vehicle. The trajectory planner 400 can be, or can be a part of, the trajectory planner 308 of FIG. 3. The trajectory planner 400 can receive drive goals 401. The trajectory planner 400 can receive a sequence of drive goals 401 that can represent, for example, a series of lane selections and speed limits that connect a first location to a second location. For example, a drive goal of the drive goals 401 can be "starting at location x, travel on a lane having a certain identifier (e.g., lane with an identifier that is equal to A123) while respecting speed limit y". The trajectory planner 400 can be used to generate a trajectory that accomplishes the sequence of the drive goals 401.

The trajectory planner 400 includes a driveline data layer 402, a reference-trajectory generation layer 404, an object avoidance layer 406, and a trajectory optimization layer 408. The trajectory planner 400 generates an optimized trajectory. Other examples of the trajectory planner 400 can include more, fewer, or other layers. In some examples, the layers can be combined; in other examples, a layer can be divided into one or more other layers.

The driveline data layer 402 includes the input data that can be used by the trajectory planner 400. The driveline data can be used (e.g., by the reference-trajectory generation layer 404) to determine (i.e., generate, calculate, select, or otherwise determine) a coarse driveline from a first location to a second location. The driveline can be thought of as the line in the road over which the longitudinal axis of the AV coincides as the AV moves along the road. As such, the driveline data is data that can be used to determine the driveline. The driveline is coarse, at this point, and may contain lateral discontinuities such as when directed to transition laterally between adjacent lanes. The driveline at this point is also not yet adjusted for objects encountered by the AV, as further described below.

In an example, the driveline data layer 402 can include one or more of High Definition (HD) map data 410, teleoperation map data 412, recorded paths data 414, preceding vehicle data 416, parking lot data 418, and perceived path data 420.

The HD map data 410 is data from a high-definition (i.e., high-precision) map, which can be used by an autonomous vehicle. The HD map data 410 can include accurate information regarding a vehicle transportation network to within a few centimeters. For example, the HD map data 410 can include details regarding road lanes, road dividers, traffic signals, traffic signs, speed limits, and the like.

The teleoperation map data 412 can include relatively short driveline data. For example, the teleoperation map data 412 can be driveline data that are 100 meters to 200 meters long. However, the teleoperation map data 412 is not necessarily so limited. The teleoperation map data 412 can be manually generated by a teleoperator in response to, or in anticipation of, exceptional situations that the AV is not capable of automatically handling.

The driveline may be created in real time. To illustrate creating the driveline in real time, an example is now provided. A teleoperator may be remotely observing the AV raw sensor data. For example, the teleoperator may see (such as on a remote monitor) construction-site pylons (e.g., captured by a camera of the AV) and draw a path for the AV through a construction zone. The teleoperator may then watch a flag person giving the go-ahead to the AV, at which point the teleoperator can cause the AV to proceed along the drawn path.

To reduce processing time of manually drawing the path when an AV reaches an exceptional situation that was previously encountered, the driveline data can also be stored remotely and sent to the AV as needed.

The recorded paths data 414 can include data regarding paths previously followed by the autonomous vehicle. In an example, an operator (e.g., a driver or a remote operator) of the autonomous vehicle may have recorded a path from the street into the garage of a home.

The preceding vehicle data 416 can be data received from one or more vehicles that precede the autonomous vehicle along a generally same trajectory as the autonomous vehicle. In an example, the autonomous vehicle and a preceding vehicle can communicate via a wireless communication link, such as described with respect to FIG. 2. As such, the autonomous vehicle can receive trajectory and/or other information from the preceding vehicle via the wireless communication link. The preceding vehicle data 416 can also be perceived (e.g., followed) without an explicit communication link. For example, the AV can track the preceding vehicle and can estimate a vehicle driveline of the preceding vehicle based on the tracking results.

The parking lot data 418 includes data regarding locations of parking lots and/or parking spaces. In an example, the parking lot data 418 can be used to predict trajectories of other vehicles. For example, if a parking lot entrance is proximate to another vehicle, one of the predicted trajectories of the other vehicle may be that the other vehicle will enter the parking lot.

In some situations map, (e.g., HD map) information may not be available for portions of the vehicle transportation network. As such, the perceived path data 420 can represent drivelines where there is no previously mapped information. Instead, the AV can detect drivelines in real time using fewer, more, or other than lane markings, curbs, and road limits. In an example, road limits can be detected based on transitions from one terrain type (e.g., pavement) to other terrain types (e.g., gravel or grass). Other ways can be used to detect drivelines in real time.

Figure 5:
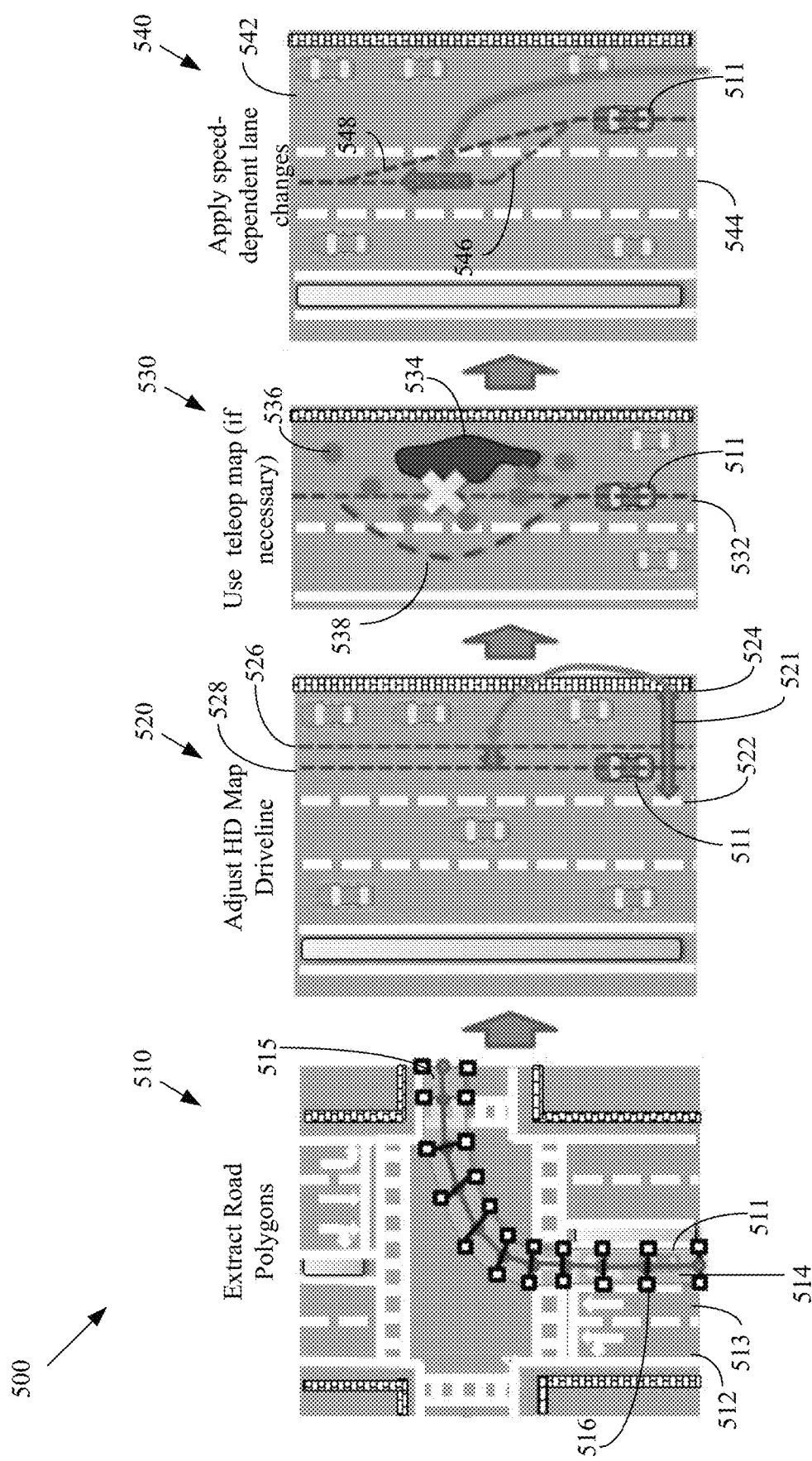
FIG. 5 is an illustration of examples of coarse-driveline concatenation.

The reference-trajectory generation layer 404 can include a driveline concatenation module 422, a strategic speed plan module 424, and a driveline synthesis module 426. The reference-trajectory generation layer 404 provides the coarse driveline to a discrete-time speed plan module 428. FIG. 5 illustrates an example of the operation of the reference-trajectory generation layer 404.

It is noted that the route planning module 304 can generate a lane ID sequence, which is used to travel from a first location to a second location thereby corresponding to (e.g., providing) the drive goals 401. As such, the drive goals 401 can be, for example, 100's of meters apart, depending on the length of a lane. In the case of the HD map data 410, for example, the reference-trajectory generation layer 404 can use a combination of a location (e.g., GPS location, 3D Cartesian coordinates, etc.) and a lane (e.g., the identifier of the lane) in the sequence of the drive goals 401 to generate a high resolution driveline (e.g., from the HD map data 410) represented as series of poses for the AV. Each pose can be at a predetermined distance. For example, the poses can be one to two meters apart. A pose can be defined by more, fewer, or other quantities as coordinates (x, y, z), roll angle, pitch angle, and/or yaw angle.

As mentioned above, the driveline data can be used to determine (e.g., generate, calculate, etc.) a coarse driveline. The driveline concatenation module 422 splices (e.g., links, fuses, merges, connects, integrates, or otherwise splices) the input data of the driveline data layer 402 to determine the coarse driveline along the longitudinal direction (e.g., along the path of the autonomous vehicle). For example, to get from location A (e.g., work) to location D (e.g., home), to determine the coarse driveline, the driveline concatenation module 422 can use input data from the parking lot data 418 to determine a location of an exit from the work location parking lot to exit to the main road, can use data from the HD map data 410 to determine a path from the main road to the home, and can use data from the recorded paths data 414 to navigate into the garage at home.

The coarse driveline does not include speed information. However, in some examples, the coarse driveline can include speed limit information, which can be used (e.g., extracted) from the HD map data 410. The strategic speed plan module 424 determines specific speed(s) along the different portions of the coarse driveline. For example, the strategic speed plan module 424 can determine that, on a first straight section of the coarse driveline, the speed of the autonomous vehicle can be set to the speed limit of that first straight section; and on a subsequent second curved section of the coarse driveline, the speed of the autonomous vehicle is to be set to a slower speed. As such, the strategic speed plan module 424 computes a law-abiding (e.g., respecting speed limits and stop lines), comfortable (e.g., physically and emotionally), and physically realizable speed profile (e.g., speed versus distance along the driveline) for the coarse driveline considering the current state (e.g., speed and acceleration) of the AV but not considering other road users or static objects.

Once a strategic speed plan is determined by the strategic speed plan module 424, the driveline synthesis module 426 can adjust the coarse driveline laterally. Considering the strategic speed profile and the coarse driveline with lateral discontinuities, the driveline synthesis module 426 determines the start and end locations of the lane change and synthesizes a driveline connecting the two locations. The length of the lane change can be speed dependent.

The driveline synthesis module 426 can synthesize drivelines joining laterally-discontinuous locations in the coarse driveline. For example, assume that the HD map data 410 includes a first section of the coarse driveline that is on a first lane of a road but that a second section of the coarse driveline is on a second lane of the same road. As such there exists a lateral discontinuity in the coarse driveline. The driveline synthesis module 426 first determines a transition distance (or, equivalently start and end locations) over which the AV should transition from the first lane to the second lane. That is, the start position is the road position when the autonomous vehicle is to be controlled to start moving from the first lane to the second lane. The end position is the road position when the autonomous vehicle is to have completed the lane change. The lateral continuity module then generates new driveline data joining the start position in the first lane to the end position in the second lane.

The transition determined by the driveline synthesis module 426 can be speed dependent. For example, a shorter transition distance can be required for the AV to transition from the first lane to the second lane when the AV is moving at a slower speed than when the AV is moving at a higher speed. For example, in a heavy traffic situation where the autonomous vehicle is traveling at a slower speed (e.g., 15 MPH), 20 yards may be required for the transition; however, if the autonomous vehicle is traveling at a higher speed (e.g., 65 MPH), then the transition distance may be 100 yards. As such, the driveline synthesis module 426 can determine the transition position depending on the speed of the AV.

The output of the driveline synthesis module 426 is provided to the object avoidance layer 406. The output of the driveline synthesis module 426 includes the coarse driveline and the strategic speed plan. The object avoidance layer 406 generates a medium-term, discrete-time speed plan and lateral constraints on the coarse driveline. For discrete points in time the future (or, equivalently, at discrete locations along the path of the AV), the discrete-time speed plan module 428 determines (i.e., calculates) a respective desired speed for the AV.

At the object avoidance layer 406, and as further described below, using the coarse driveline, nearby static objects, and nearby dynamic objects and their predicted trajectories, the object avoidance layer 406 determines (e.g., extracts) a drivable area where the AV can be safely operated. Right and left boundaries of each bin (described below) are determined. Given a current speed of the AV, a real-time speed plan can be generated. The real-time speed plan can be used to estimate future locations of the AV. The future locations of the AV can be evaluated against future anticipated (e.g., predicted) locations of dynamic objects. The drivable area of the AV is adjusted to remove areas of the drivable area that correspond to (e.g., overlap) locations of the dynamic objects.

At the object avoidance layer 406, the coarse driveline is evaluated and/or adjusted for objects. The objects can be objects external to and proximal to the AV. As such, the objects can be the objects described with respect to the world model module 302 of FIG. 3. As such, given a current speed of the AV, the object avoidance layer 406 generates a real-time speed plan. Using the real-time speed plan, the object avoidance layer 406 can estimate future locations of the AV at discrete future time points. The future locations can be evaluated against the locations of the objects (i.e., the objects of the world model) to provide (e.g., generate) a smooth drive for the AV. Providing a smooth drive (i.e., a smooth trajectory) can be an iterative process, as further described below.

To summarize, a coarse driveline is first generated; a speed plan is then generated from the coarse driveline; and, given the coarse driveline and the speed plan, a trajectory is optimized in view of other objects that are maintained in the world model of the AV, to provide an optimized desired trajectory. The trajectory is optimized in an adjusted drivable area. Non-drivable areas (i.e., areas where the AV cannot be safely driven because of the other objects) are removed from a default drivable area to provide the adjusted drivable area.

FIG. 5 is an illustration of examples 500 of coarse-driveline concatenation. The examples 500 are examples of the operation of the reference-trajectory generation layer 404 of FIG. 4.

In a view 510, an AV 511 is in a rightmost lane 514 of a three-lane road that includes lanes 512-514. Note that the view 510 is an example of a left-hand traffic system (i.e., the traffic in the lanes 512-514 moves from the bottom towards the top of FIG. 5). A route planner, such as the route planning module 304, may have determined, based on HD map data, such as the HD map data 410 of FIG. 4, that the AV 511 is to turn right onto lane 515 of a one-lane road. The HD map may provide the centerline (not shown) for each lane.

In some situations, the driveline of the AV may not coincide with the centerline of a lane or road. For example, the lane 515 may be extra-wide to accommodate parking spaces along the left side of the lane 515. In another example, it may be found that most drivers prefer to drive slightly left of the centerline. As such, the driveline of the AV 511 is to be set to the left of the centerline of the lane 515. As such, the driveline concatenation module 422 determines the geometry of the lanes in order to determine the driveline given the lane geometry (e.g., the lane width). For example, when there is a turn in the coarse driveline, the driveline concatenation module 422 determines where the driveline is to be moved (i.e., off the lane centerline) based on the width of the lane, the turning direction (e.g., right or left), the turning angle, and/or the turning speed. That is, the driveline concatenation module 422 sets the driveline of the AV based on the HD map centerline. In an example, the driveline can be set based on the lane width.

To set the driveline of the AV, the driveline concatenation module 422 determines the geometry of lanes along the coarse driveline. In an example, the driveline concatenation module 422 determines the geometry for a certain distance (e.g., 100 meters, 200 meters, 300 meters, etc.) along the coarse driveline. To determine the geometry, the driveline concatenation module 422 can determine polygons, such as a polygon 516 along the coarse driveline, which can be used to define lane boundaries.

A view 520 illustrates determining the driveline (i.e., a coarse driveline) based on a width 521 of a lane. A right edge 524, a left edge 522, and a centerline 526 of a lane along which the AV 511 is traveling can be obtained from the HD map. The driveline concatenation module 422 determines the driveline 528 (i.e., the coarse driveline) based on the width 521. As such, the driveline 528 is shifted from the centerline 526.

A view 530 illustrates using teleoperation data, such as described with respect to the teleoperation map data 412 of FIG. 4, in order to determine a driveline. As described above, whereas the HD map data are static data, teleoperation data can provide a real-time driveline based on road conditions and/or exceptional situations. For example, a construction zone exists along a driveline 532 of the AV 511. The construction zone is bounded by obstacles, such as a pylon 536, which surround a construction project 534. As such, the driveline concatenation module 422 adjusts, as further described below, the driveline 532 to be a driveline 538 (i.e., a coarse driveline) using a real-time driveline that is provided by the teleoperation data.

A view 540 illustrates a speed-dependent lane change. The speed-dependent lane change can be implemented, as described above, by the driveline synthesis module 426 of FIG. 4. In an example, the decision making module 306 of FIG. 3 provides that the AV 511, traveling along a lane 542, is to be next in a lane 544, for example, because the lane 542 ends or because the AV 511 is to turn left. As such, the AV 511 is to move from the lane 542 to the lane 544 at some point. As the HD map may not provide lane transition information, the reference-trajectory generation layer 404 of the AV 511 determines the lane transition time. As mentioned above, the transition can be speed dependent.

In an example, the trajectory planner 400 (of which the reference-trajectory generation layer 404 is a layer) can determine that at a point X along the coarse driveline, the AV 511 will be moving at a speed Y (as determined by the strategic speed plan module 424). In a case where the AV 511 is moving at a low speed (e.g., 35 MPH), the driveline synthesis module 426 can determine that the transition can be slow. Accordingly, the path to move from the lane 542 to the lane 544 can be as shown by a path 546. On the other hand, if the AV 511 is traveling at a high speed (e.g., 65 MPH), the path to switch lanes requires a longer distance, as shown by a path 548.

The time required to follow the paths 546 and 548 can be the same. However, the distance is different. The distance required for the lane transition when the AV 511 is traveling at a first speed is longer than the distance required when the AV 511 is traveling at a second speed that is slower than the first speed.

A lane-change rate can be used to determine the speed-dependent lane change. That is, the lane-change rate can be used to create a connection between two adjacent lanes, such as the lane 542 and the lane 544 of the view 540. The lane-change rate can be defined in "meters per meter:" How many meters does the path move laterally per meter longitudinally? As mentioned above, the goal is to identify a lane change rate that leads to the completion of the lane change in a target amount of time: If the AV is travelling slowly (for example, during dense rush-hour traffic), the lane change rate is high and takes place over a short distance (e.g., on the order of tens of meters); if the AV is travelling quickly (e.g., at highway speeds), the lane change rate is slow and takes place over a long distance (e.g., on the order of hundreds meters).

Figure 6:
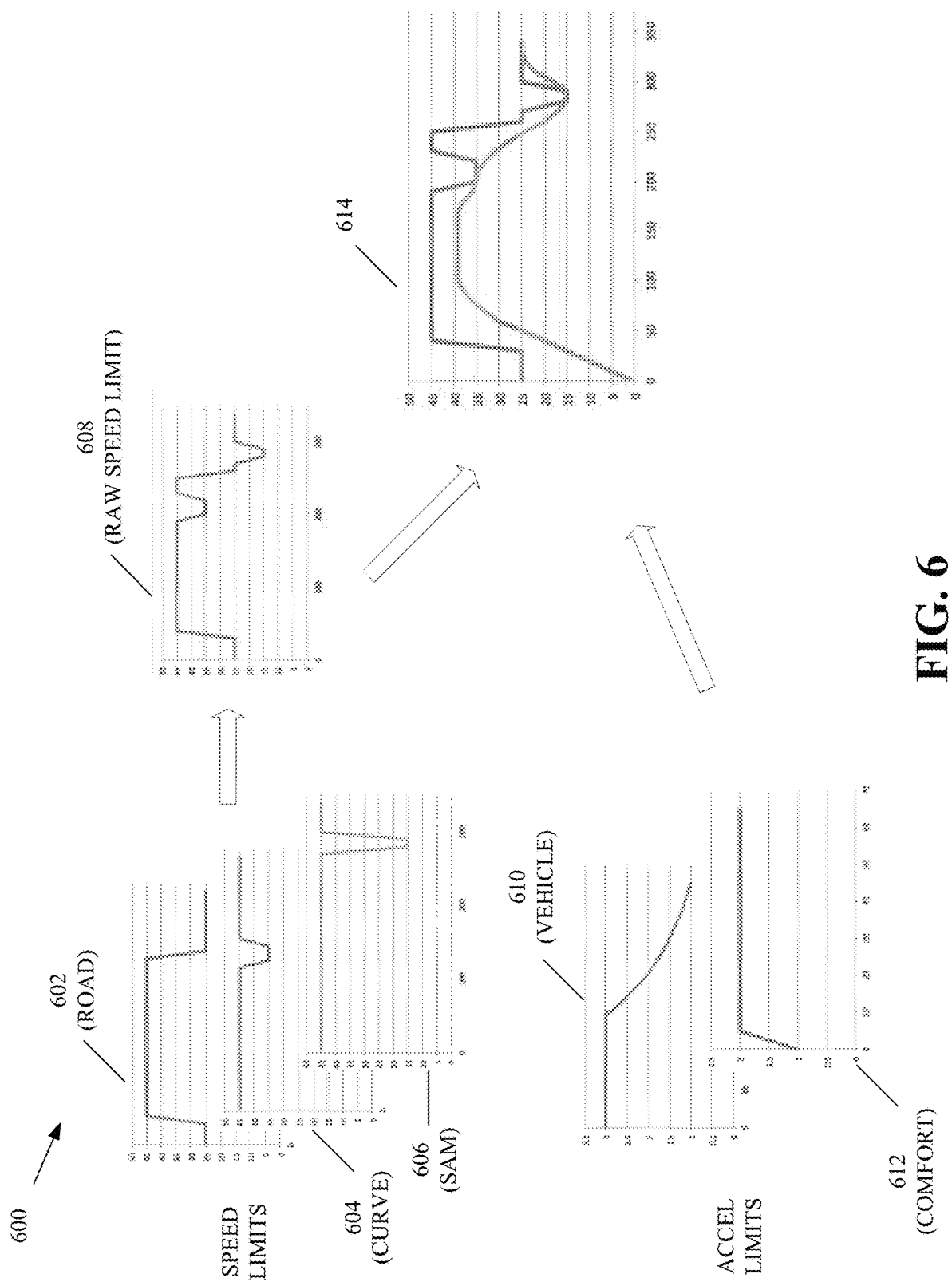
FIG. 6 is an example of determining a strategic speed plan.

FIG. 6 is an example 600 of determining a strategic speed plan. The example 600 illustrates examples of inputs that can be used by the strategic speed plan module 424 of FIG. 4 to determine a strategic speed plan 614. In some implementations, the strategic speed plan module 424 can use more, fewer, or other inputs to determine the strategic speed plan.

In the example 600, speed limits inputs and acceleration limits inputs can be used. The speed limits can include at least one of road speed limits 602, curvature speed limits 604, and seamless autonomous mobility (SAM) data 606. The acceleration limits can include vehicle acceleration limits 610 and comfort limits 612. The speed limits and/or the acceleration limits can include more, fewer, or other inputs.

The road speed limits 602 can be the road speed limits, such as those posted on speed limit signs (e.g., 20 MPH, 65 MPH, etc.). In an example, the road speed limits 602 can be obtained from an HD map. The curvature speed limits 604 can be data relating vehicle speed to a curvature of a turn, such as a turn along the coarse driveline of the AV. Alternatively, the curvature speed limits 604 can only provide road curvature information (e.g., the turning radius of a curve). The curvature speed limits 604 can be limits on the lateral acceleration of the AV. As such, the speed plan can include decreased AV speeds, consistent with the curvature speed limits 604, when the AV curves.

The SAM data 606 can be data gathered (such as in a cloud-based system) from vehicles (autonomous or otherwise). The data can enable vehicles (including AVs) to operate safely and smoothly on the road. In an example, the SAM data 606 can include vibration data collected from vehicles along a portion of a road. The vibration data can correlate vibration levels and speeds at different portions of the road. In an example, the vibration data may indicate, for a certain road location, an unacceptable level of vibration (for example, due to a speed bump at the portion of the road) when a vehicle is traveling above a certain speed. As such, to minimize the impact of the vibration, the AV is to be slowed down (below the certain speed) at the portion of the road. In an example, the SAM data 606 can be received by the AV from a central sever, such as the operations center 230, the server computing device 234, or some other network device. In an example, the SAM data 606 can be data accumulated from other vehicles within a certain time period (e.g., 1 minute, 10 minutes, 20 minutes, etc.) of the autonomous vehicle arriving at that location. In an example, the AV can pull the SAM data 606. In another example, the SAM data 606 can be pushed to the AV based on the AV reporting its location to a server that provides the SAM data 606.

The road speed limits 602, the curvature speed limits 604, and the SAM data 606 can be combined to provide raw speed limits 608. In an example, for each location of certain locations along the coarse driveline (e.g., every 5 meters, 10 meters, etc.), the minimum of the speed of the road speed limits 602 at that location, the speed of the curvature speed limits 604 at that location, and the speed of the SAM data 606 at that location is used as the speed of the raw speed limits 608 at that location.

The vehicle acceleration limits 610 can be AV acceleration limits that are due to the torque and power of the AV. The comfort limits 612 includes human comfort limits regarding acceleration, such as: How fast do the occupants of the AV want to the AV to accelerate?

The strategic speed plan module 424 of the reference-trajectory generation layer 404 can combine the raw speed limits 608, the vehicle acceleration limits 610, and the comfort limits 612 to provide the strategic speed plan 614, which is a smooth speed plan.

As mentioned above, at a location along the coarse driveline, the minimum of the road speed limits 602, the curvature speed limits 604, and the seamless autonomous mobility SAM data 606 can be used as the speed limit of the AV. The vehicle acceleration limits 610 and the comfort limits 612 relate acceleration to speed. As such, and in an example, the vehicle acceleration limits 610 and the comfort limits 612 can be combined by finding the minimum of the two maximum curves (comfort, speed). As such, at low speed, comfort can limit the maximum acceleration of the AV; whereas at high speed, the acceleration limits (e.g., the power) of the AV can limit the acceleration of the AV. A speed profile can be generated by solving for the fastest speed profile along the coarse driveline that satisfies the constraints on speed (speed limit at any given location along the driveline) and acceleration (acceleration limit at any given speed).

Inputs other than those described above can also be used to calculate the strategic speed plan 614. For example, one or more of road mu, minimum cruise times, neighborhood type, or other inputs can be used. Road mu relates to the road slipperiness, such as due to ice, rain, slope, etc.

A minimum cruise time relates to the minimum length of time that the speed of the AV can be set to a constant speed. For example, assume that a segment of a road is 400 meters long and that the speed limit on that segment is 45 MPH. Additionally, assume that, given a motion model of the AV, 250 meters are required for the AV to reach the speed limit of 45 MPH from a stopped position, and 250 meters are required for the AV to be stopped given a current speed of 45 MPH. If the AV were at a stopped position at the beginning of the road segment and the AV is to be stopped again at the end of the road segment, then as soon as the AV reaches the speed limit of 45 MPH, the AV would have to start decelerating. Such speed profile may not be desirable and/or natural for occupants of the AV. As such, a minimum cruise time can indicate, for example, that a speed must be maintained for the minimum cruise time (e.g., 3 seconds) before the AV can start decelerating (or accelerating). As such, a more natural speed profile can be provided.

The neighborhood type can be used to model normal human driving behaviors, which may depend on the type of neighborhood that the AV is traversing through. For example, a human driver may drive below the posted speed limit in a residential neighborhood (e.g., where kids may be observed playing on the streets) and may drive at least at the posted limit in an industrial neighborhood, even though both neighborhoods may have the same posted speed limit.

Figure 7:
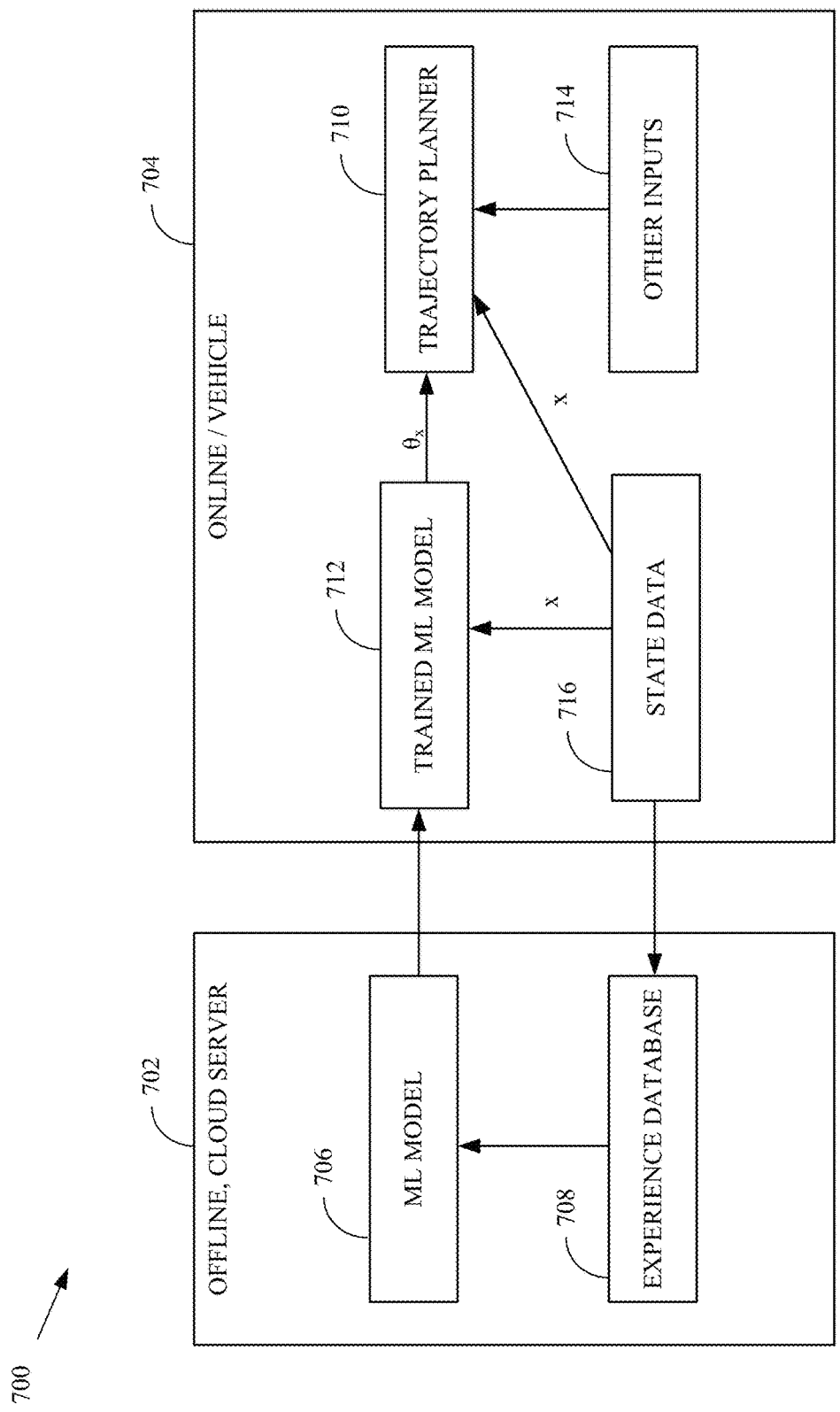
FIG. 7 is a block diagram of an example of a system for imitation learning for trajectory planning.

FIG. 7 is a block diagram of an example of a system 700 for imitation learning for trajectory planning. The system 700 is shown as including an server 702, which can receive drive data that include state data from multiple vehicles. For simplicity, only one such vehicle (i.e., a vehicle 704) is shown in FIG. 7. The server 702 can be a cloud-based server. The server 702 can be the server computing device 234 of FIG. 2. The server 702 can be any server that can be configured to receive data from vehicles, such as the vehicle 704, and can be configured to train an ML model 706, as described herein. The server 702 can include a software platform (not shown) that can be used to train the ML model 706. The server 702 can be a computing device that has a configuration that is similar to that of the computing device 1100 of FIG. 11.

The server 702 can receive data from many vehicles configured to transmit data to the server 702. Some of such vehicles may be at least partial autonomous driving or may be driver-driven vehicles. As such, while the vehicle 704 is shown as including a trajectory planner 710 that may be as described herein, some of the vehicles that transmit data to the server 702 may not include a trajectory planner.

As the vehicle 704 traverses a transportation network, the trajectory planner 710 receives state data 716 (i.e., state data x), other inputs 714, and one or more parameters $\theta_x$ from a trained ML model 712. The trajectory planner 710 uses these inputs to compute a trajectory (e.g., a short term speed plan). The other inputs can be or include an HD map, a standard-definition (SD) map, or other driveline data, such as one or more of those described with respect to the driveline data layer 402 of FIG. 4. Based on the state data 716, the trained ML model 706 outputs parameters that the trajectory planner 710 uses to compute the speed plan. In an example, the trajectory planner 710 can obtain parameters $\theta_x$ for every planning cycle. To illustrate, the trajectory planner 710 may compute a trajectory plan every 0.1 seconds and, as such, obtains new parameters $\theta_x$ every 0.1 seconds. In another example, the trajectory planner 710 uses a same set of parameters $\theta_x$ for a predetermined number of planning cycles (e.g., iterations).

The state data 716 (e.g., at least a portion thereof) are transmitted to the server 702. The state data 716 can be stored in an experience database 708. The experience database 708 can be any data store facility that is capable of long term storage of data. The experience database 708 may be a relational database management system, an object database, an XML database, a configuration management database, a management information base, one or more flat files, other suitable non-transient storage mechanisms, or a combination thereof.

The state data 716 can be or can include data derived from sensors of the vehicle 704. Examples of state data can include, but are not limited to, localization data (such as a current latitude and longitude of the vehicle 704), data derived from radar (such as a distance to a leading vehicle, a distance to a vehicle that is to the left of the vehicle 704, a distance to a vehicle to the right of the vehicle 704), data relating to autonomous driving (such as whether autonomous driving is enable or disabled, a set target time headway, and a desired cruise control speed), other state data, road lines, stop signs or traffic lights, road curvature, perceived surrounding vehicles or other road users (collectively, perceived other road objects), or combination thereof. In an example, the road lines, the stop signs or traffic lights, and/or the road curvature may be perceived data (i.e., obtained using sensor data) or may be obtained from HD map data. Additional data may also be associated with the state data in the experience database 708. Such additional data may be used, at least partially, to determine whether particular state data meet a selection criterion. To illustrate, an identifier of a particular vehicle from which certain state data were obtained may be associated with those state data in experience database 708.

The server 702 can use at least some of the state data that are stored in the experience database 708 to train the ML model 706. Once trained, the ML model 706 can be deployed to the vehicle 704 as trained ML model 712. Deploying the ML model 706 to the vehicle 704 can mean configuring the vehicle 704 (i.e., a processor therein, such as the processor 120 of FIG. 1) to use the learned parameters $\phi^*$ of the ML mode. The learned parameters can be stored in a memory of the vehicle 704, such as the memory 122 of FIG. 1.

The parameters $\theta_x$ can include many parameters (e.g., 10s or 100s of parameters), however, as a simple and trivial illustrative example, assume that the only parameter $\theta_x$ that is output from the trained ML model 712 is the value of the target time headway (TTH). Assume further that the trained ML model 712 has implicitly learned the that the state x and the target time headway are related by the function a/v+b, where v may be the vehicle speed as obtained from the state data and b is a y-intercept constant that is embedded (or obtained implicitly from) the learned parameters $\phi^*$ of the trained ML model 712. As such, the trained ML model 712 outputs $\theta_x$ $g(x, \phi^*)$=a/v+b. In another illustrative example, the trained ML model 712 may have learned and may output a value for the TTH that depends on state data indicating the vehicle speed, the location of the vehicle, whether another vehicle is attempting to maneuver itself in front of the vehicle, or some other state data. It is noted that, more realistically, $\theta_x$ may be a vector of parameters.

The ML model 706 (and correspondingly, the trained ML model 712) can be one or more ML models. For example, different models may be obtained based on the subset of the state data in the experience database 708 that is used to train an ML model. That is, the input training data can be personalized by sub-selecting a subset of the state data according to a selection criterion. In an example, the subset may correspond to a certain entity. For example, the training data may be the subset of the state data obtained from drivers or a fleet of vehicles associated with a particular corporate entity. In an example, the training data may be the state data associated with a particular person. In yet another example, the training data may be the state data associated with multiple entities. In yet another example, the training data may be all of the state data in experience database 708. Each training dataset may result in a corresponding trained ML model. More generally, the ML model 706 can be trained using state data that meet a selection criterion.

Each of the trained ML models may be thought of as being associated with or representing a respective driving style. In an example, an occupant of the vehicle 704 may choose which particular trained ML model is to be used for obtaining parameters for the trajectory planner 710. As such, the occupant can be said to be selecting a driving style for the autonomous driving of the autonomous vehicle. As such, a customer (e.g., user, person, occupant, driver, etc.) may select the machine-learning model to be used on a particular drive.

Figure 8:
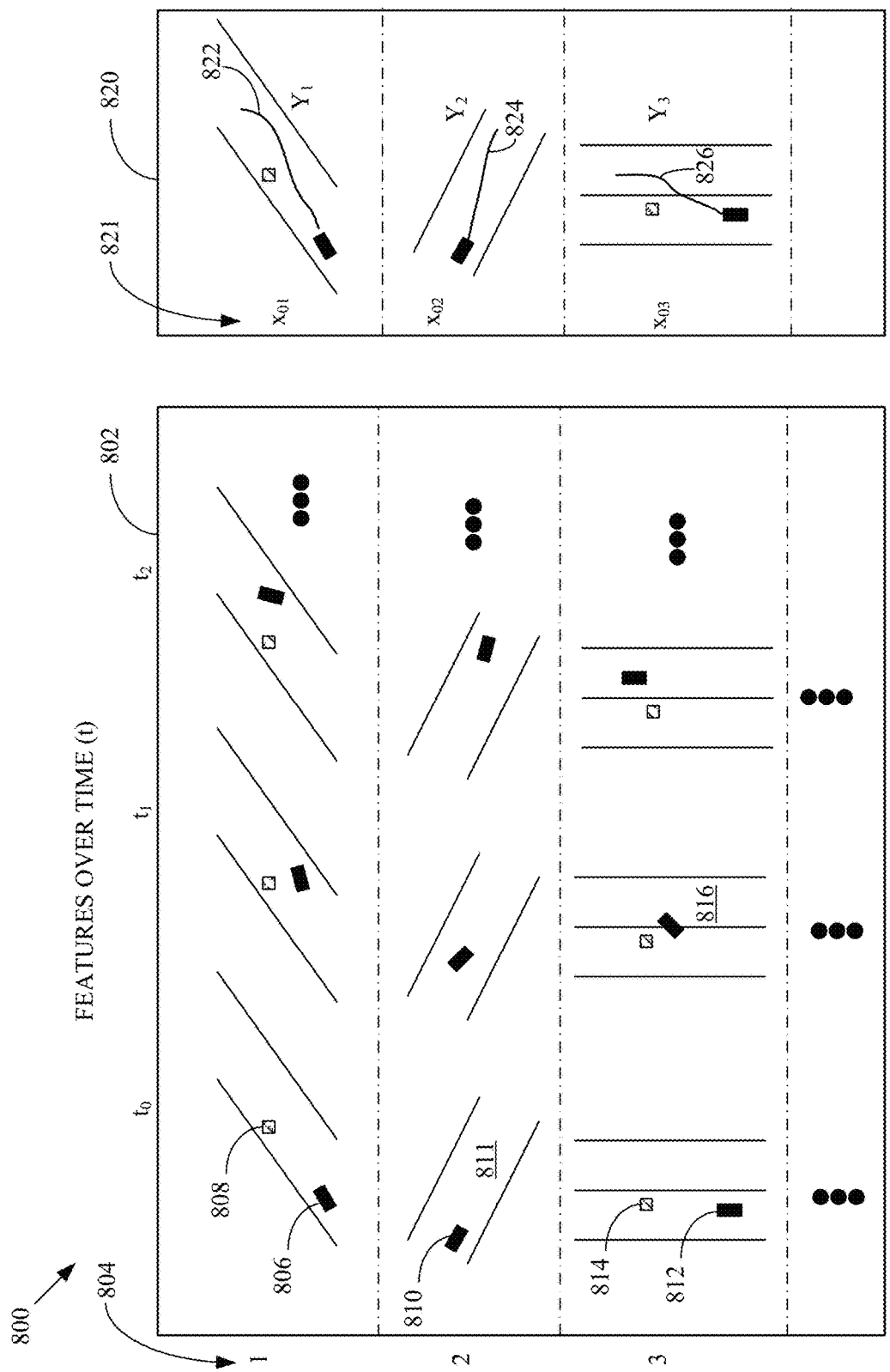
FIG. 8 illustrate an example of training a machine learning model that can be used to output parameters for a trajectory planner.

FIG. 8 illustrate an example 800 of training a machine learning model that can be used to output parameters for a trajectory planner. At least a subset of the sensor data from an experience database may be partitioned into snippets having a predefined length. The subset of the sensor data selected from the experience database are those that meet a selection criterion. In an example, the predetermined length can be 5 seconds. However, other predefined lengths are possible. In an example, the snippets may be overlapping snippets. In an example, the snippets are consecutive (i.e., non-overlapping) snippets.

A block 802 graphically illustrates the training data. The block 802 illustrates 3 snippets indicated by identifiers 804 (i.e., ID 1, ID 2, and ID 3). Each of the identifiers 804 illustrates changes, over time, of state variables. ID 1 illustrates a snippet of a drive where an obstacle 808 is perceived ahead of a vehicle 806. The snippet of ID 1 may include, among other state data, the location of the obstacle 808, the poses and speeds of the vehicle 806. The snippet of ID 1 illustrates that the vehicle 806 moved over to the right to get around the obstacle 808 and then, at time step $t_2$, after passing the obstacle 808, the vehicle 806 starts to move back toward the middle of a driving lane. The snippet of ID 2 may describe the state changes as a vehicle 810 may be weaving in a lane 811. The snippet of ID 3 may describe the state changes as a vehicle 812 moves to an adjacent lane (which may be an opposite traffic lane) to overtake a slow moving vehicle 814. It is noted that the specific details of the scenarios captured in or described by the snippets is not necessary to the understanding of this disclosure.

A block 820 illustrates that when at least some of state data of the snippets illustrated in the block 802 are input to a trajectory planner, which may be a trajectory planner that uses fixed parameters, respective trajectories are obtained. To illustrate, when the at least some of state data corresponding to the snippets of ID 1-3 are input to the trajectory planner, trajectories 822-826 (designated Y1-Y3), respectively, are generated by the trajectory planner. The trajectory planner determines which subset of the state data it receives are to be used for generating a trajectory (i.e., trajectory generating state data). For example, the trajectory planner may use state data associated with perceived other world objects and changes to such states over time and may ignore any data related to the trajectory followed by the vehicle from which the snippet is obtained. The training data can be thought of as being simulation data for the trajectory planner where, instead of using sensor data obtained from actual sensors of a vehicle, the sensor data can be obtained from the training data. Each of the trajectories $Y_1$-$Y_3$ can be represented as a corresponding set of poses, speeds, and/or other planned trajectory describing data. Associated with each of the trajectories $Y_i$ is a corresponding set of simulated state data $x_{0i}$.

The training data in the experience database may be referred to as "actual state data." Training the ML model can amount to minimizing a loss between at least some of the actual state data of the snippets and the actual simulated state data obtained from the trajectory planner therewith resulting a trained ML model that can be used to obtain parameters $\theta_x$.

Symbolically, a trajectory output by the trajectory planner is denoted $Y_p$ (i.e., planned trajectory); and a trajectory included (i.e., described) in the training data is denoted $Y_a$ (i.e., actual trajectory). As such, training the ML model amounts to minimizing the differences between planned trajectories ($Y_p$) and actual trajectories ($Y_i$). As described above, a planned trajectory $Y_p$ can be obtained using equation (1), where x, $\theta$, and $f(x, \theta)$ are as described above.

$$Y_p = f(x, \theta) \quad (1)$$

Minimizing the loss to obtain the learned parameters $\phi^*$ of the ML can be given by equation (2):

$$\phi^* = \underset{\phi}{\mathrm{argmin}} \sum_i [Y_i - f(x_{0i}; g(x_{0i}; \phi))]^2 \quad (2)$$

In equation 2, $f(x_{0i}; g(x_{0i}; \phi))$ corresponds to the trajectory obtained from the ML model that is being trained. Thus, $f(x_{0i}; g(x_{0i}; \phi))$ corresponds to a planned trajectory $Y_p$. $Y_i$ corresponds to an actual trajectory $Y_a$. As described above, the learned parameters $\phi^*$ can be deployed (i.e., used by) an autonomous vehicle, as described with respect to the trained ML model 712 of FIG. 7. Other loss functions than that shown in equation (2) can be used. For example, different types of p-norms or regularizations (e.g., ridge, lasso, etc.) can be used.

While not specifically shown in equation (2), the minimization/optimization problem of equation (2) can include constraints on the function g( ). That is, constraints may be imposed on the parameters to be output from the ML model. Stated yet another way, the learned parameters can be subject to constraints (clamping values) imposed on at least some of the parameters that are to be output by the trained ML model. To illustrate, the trained ML model should not output TTH values that are less than or equal to zero.

Figure 9:
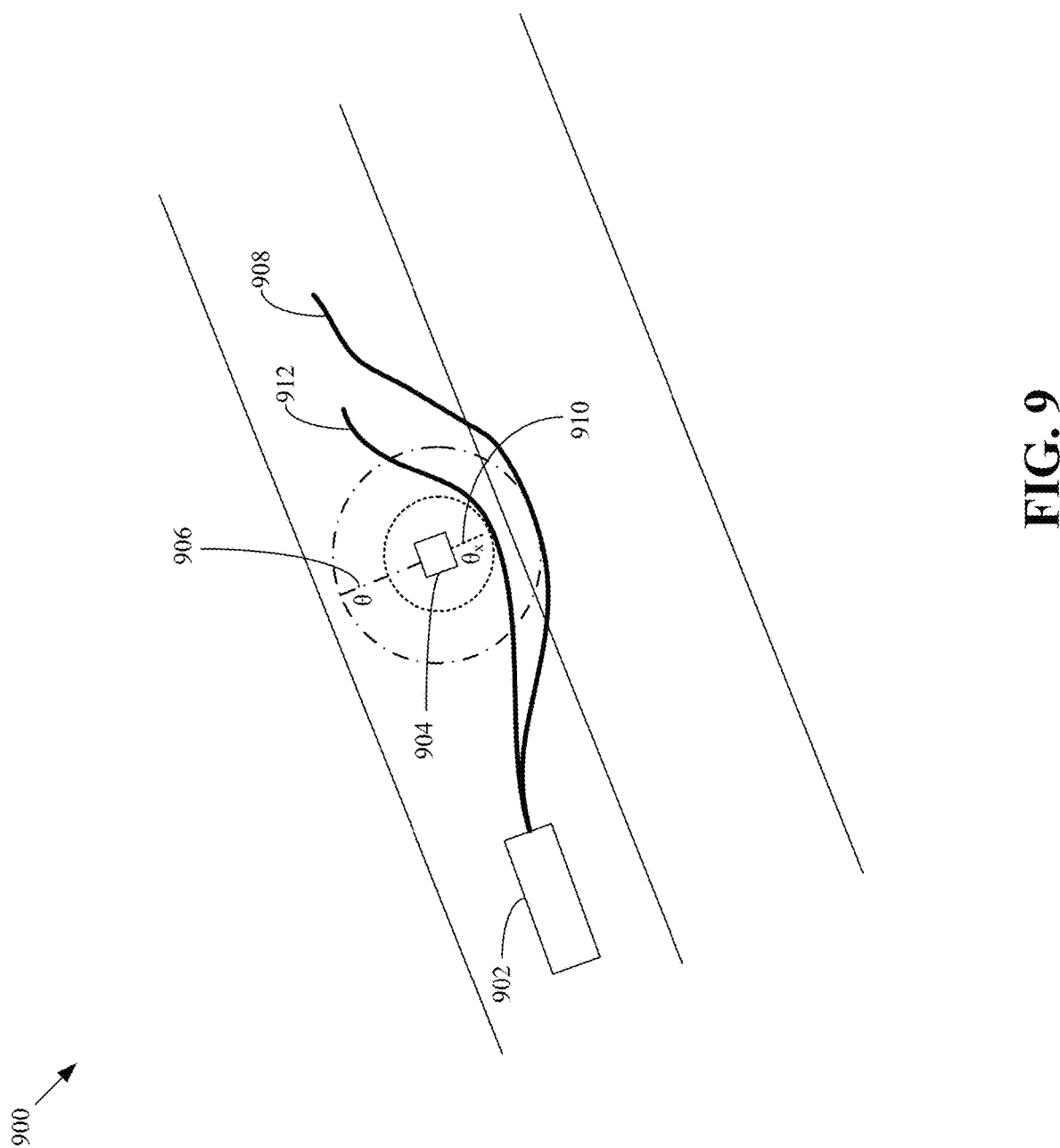
FIG. 9 illustrates an example of a learned parameter for trajectory planning.

FIG. 9 illustrates an example 900 of a learned parameter for trajectory planning. The scenario illustrated in FIG. 9 is that of an autonomous vehicle 902 the sensors of which have perceived a slow moving vehicle 904 that is obstructing the path of the autonomous vehicle 902. A trajectory 908 illustrates a trajectory obtained using a trajectory planner that is configured using a fixed parameter 906 that sets a radial distance from an autonomous vehicle to a nearby object. The parameter is denoted $\theta$ and can be used by the trajectory planner to set the clearance between the AV and an object being passed by the AV. Thus, when getting close to or passing the slow moving vehicle 904, the trajectory planner computes the trajectory 908 that is according to $\theta$. The trajectory 908 can be denoted by $f(x; \theta)$, as described above. On the other hand, an ML model, such as the trained ML model 712 of FIG. 7 may have learned (from experience data) to use a learned parameter 910 (denoted $\theta_x$). Using the learned parameter 910, the trajectory planner that uses the learned parameter 910 computes a trajectory 912. The learned parameter 910 is represented symbolically by $g(x; \phi^*)$; and the trajectory 912 can be represented by $f(x, g(x; \phi^*))$.

Figure 10:
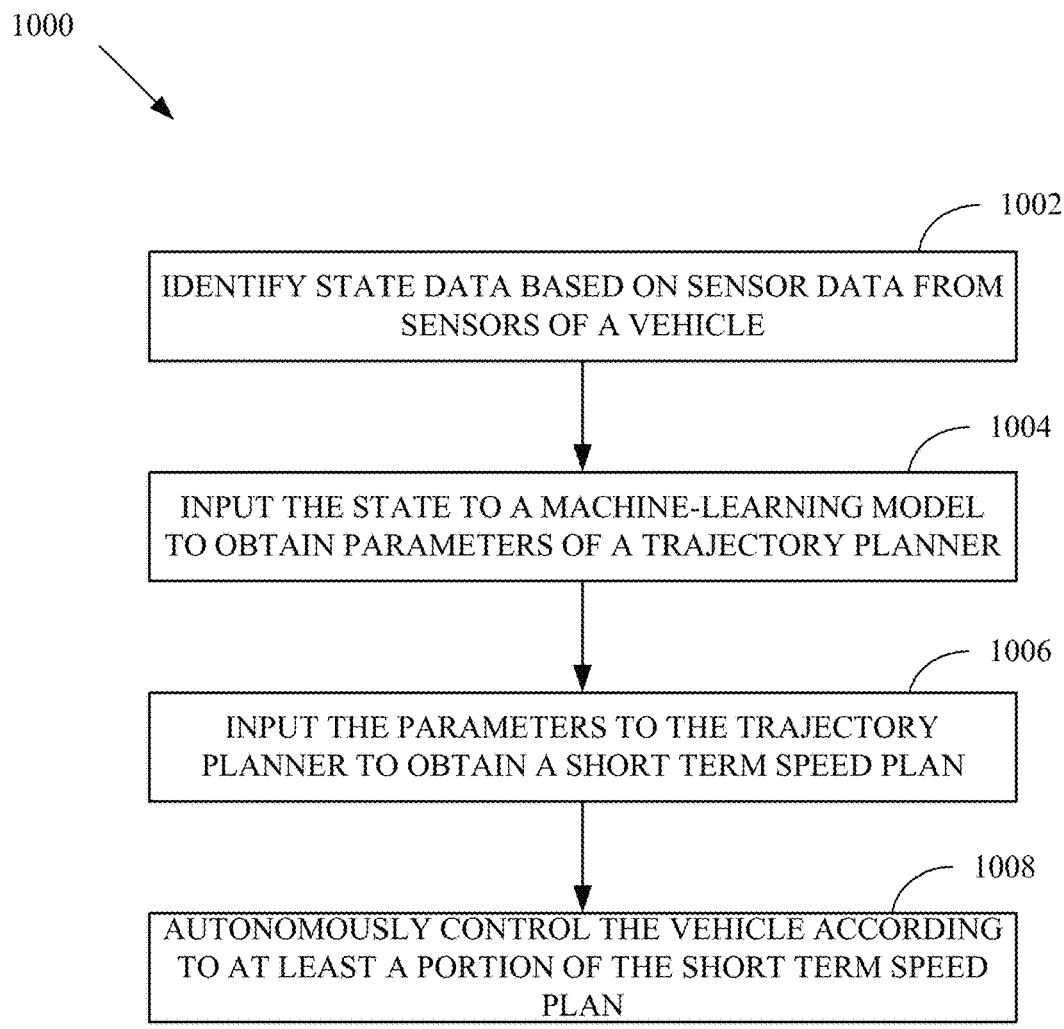
FIG. 10 is a flowchart of an example of a technique for trajectory planning.

FIG. 10 is a flowchart of an example of a technique 1000 for trajectory planning. The technique 1000 can be executed using computing devices of a vehicle that can be an at least partially autonomous vehicle, such as the systems, hardware, and software described herein. The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, state data are identified based on sensor data from sensors of the vehicle. The state data can be the state data 716 of FIG. 7. At 1004, the state data are input to a machine-learning model to obtain parameters of a trajectory planner. The machine-learning model can be the trained ML model 712 of FIG. 7. At 1006, the parameters are input to the trajectory planner to obtain a short term speed plan. The parameters can be as described above with respect to $\theta_x$; and the trajectory planner can be the trajectory planner 710 of FIG. 7. At 1008, the vehicle is autonomously controlled according to at least a portion of the short term speed plan. That is, actuators of the vehicle may be controlled according to the at least a portion of the short term speed plan.

As described above, the machine-learning model can be trained using state data received from other vehicles. In an example, the machine-learning model can be trained using data samples extracted from the state data where each data sample constitutes a snippet having a predefined length. The state data can include data related to at least two of localization data, data related to autonomous driving, or data relate to perceived other road objects. In an example, the parameters of the trajectory planner can include at least one of a target timing headway parameter or a target radial distance. In an example, the machine-learning model can be trained using state data that meet a selection criterion. In an example, a selection of the machine-learning model can be received, such as from a customer. That is, several machine-learning models may be available and the technique 1000 receives a selection of one of the available machine-learning models.

Figure 11:
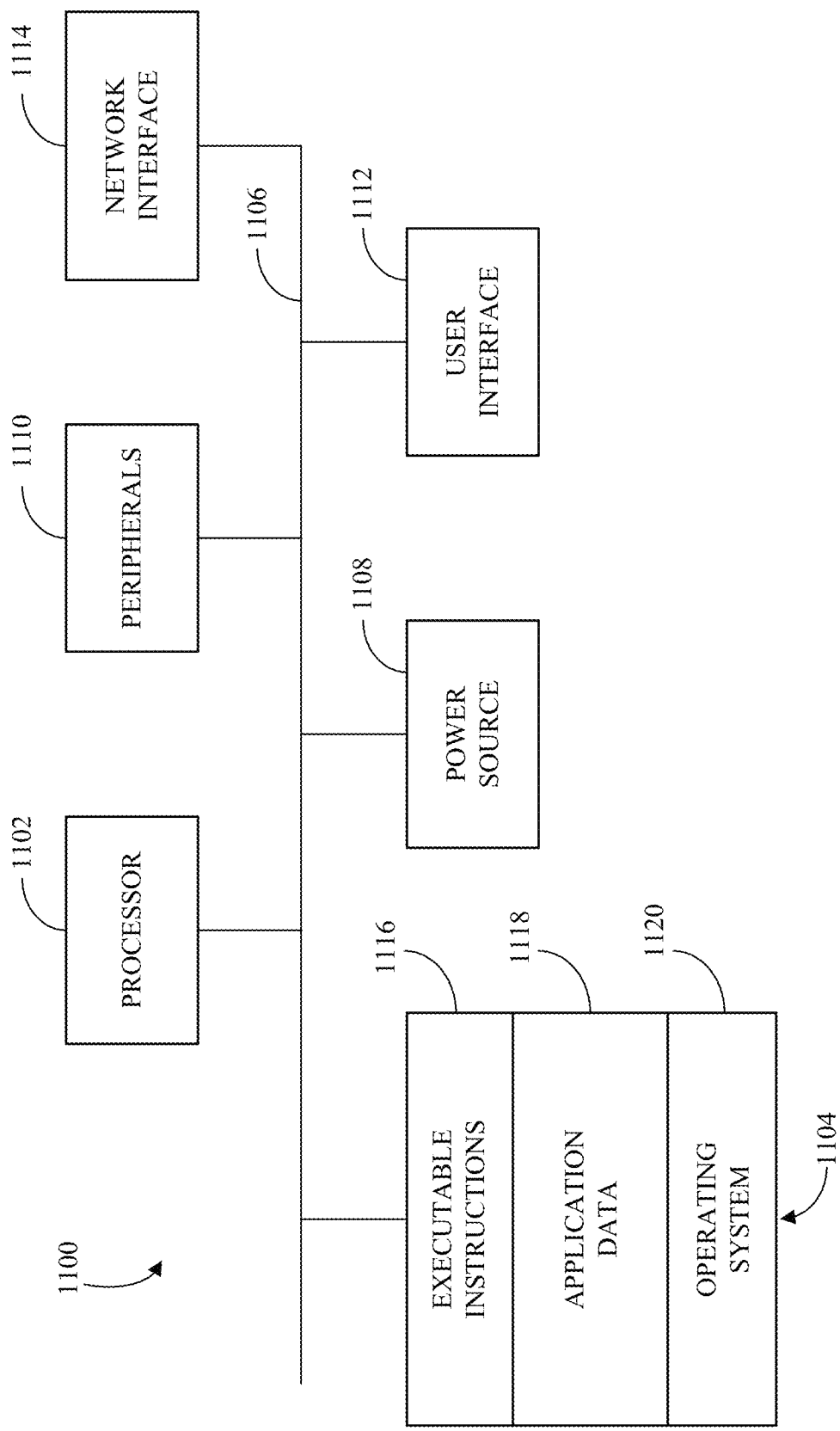
FIG. 11 is a block diagram of an example internal configuration of a computing device.

FIG. 11 is a block diagram of an example internal configuration of a computing device 1100. In an example, the computing device can be the server computing device 234 of FIG. 2. In an example, the computing device 1100 can be used for training a machine-learning model to output trajectory planner parameters, for example, the server 702 shown in FIG. 7. The computing device 1100 may be used to implement a server on which a software platform that can be used to receive state data from vehicles, store the state data in an experience database, use at least a subset of the state data to train the machine-learning model, and transmit the trained model (e.g., parameters thereof) to a vehicle. Alternatively, the computing device 1100 may be used as or to implement another client, server, or other device according to the implementations disclosed herein.

The computing device 1100 includes components or units, such as a processor 1102, a memory 1104, a bus 1106, a power source 1108, peripherals 1110, a user interface 1112, and a network interface 1114. One of more of the memory 1104, the power source 1108, the peripherals 1110, the user interface 1112, or the network interface 1114 can communicate with the processor 1102 via the bus 1106.

The processor 1102 is a central processing unit, such as a microprocessor, and can include single or multiple processors having single or multiple processing cores. Alternatively, the processor 1102 can include another type of device, or multiple devices, now existing or hereafter developed, configured for manipulating or processing information. For example, the processor 1102 can include multiple processors interconnected in any manner, including hardwired or networked, including wirelessly networked. For example, the operations of the processor 1102 can be distributed across multiple devices or units that can be coupled directly or across a local area or other suitable type of network. The processor 1102 can include a cache, or cache memory, for local storage of operating data or instructions.

The memory 1104 includes one or more memory components, which may each be volatile memory or non-volatile memory. For example, the volatile memory of the memory 1104 can be random access memory (RAM) (e.g., a DRAM module, such as DDR SDRAM) or another form of volatile memory. In another example, the non-volatile memory of the memory 1104 can be a disk drive, a solid state drive, flash memory, phase-change memory, or another form of non-volatile memory configured for persistent electronic information storage. The memory 1104 may also include other types of devices, now existing or hereafter developed, configured for storing data or instructions for processing by the processor 1102.

The memory 1104 can include data for immediate access by the processor 1102. For example, the memory 1104 can include executable instructions 1116, application data 1118, and an operating system 1120. The executable instructions 1116 can include one or more application programs, which can be loaded or copied, in whole or in part, from non-volatile memory to volatile memory to be executed by the processor 1102. For example, the executable instructions 1116 can include instructions for performing some or all of the techniques of this disclosure. The application data 1118 can include user data, data store data (e.g., files, database catalogs, or dictionaries), or the like. The operating system 1120 can be, for example, Microsoft Windows®, Mac OS X®, or Linux®; an operating system for a small device, such as a smartphone or tablet device; or an operating system for a large device, such as a mainframe computer.

The power source 1108 includes a source for providing power to the computing device 1100. For example, the power source 1108 can be an interface to an external power distribution system. In another example, the power source 1108 can be a battery, such as where the computing device 1100 is a mobile device or is otherwise configured to operate independently of an external power distribution system.

The peripherals 1110 includes one or more sensors, detectors, or other devices configured for monitoring the computing device 1100 or the environment around the computing device 1100. For example, the peripherals 1110 can include a geolocation component, such as a global positioning system location unit. In another example, the peripherals can include a temperature sensor for measuring temperatures of components of the computing device 1100, such as the processor 1102.

The user interface 1112 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 1114 provides a connection or link to a network (e.g., the network 212 shown in FIG. 2). The network interface 1114 can be a wired network interface or a wireless network interface. The computing device 1100 can communicate with other devices via the network interface 1114 using one or more network protocols, such as using Ethernet, TCP, IP, power line communication, Wi-Fi, Bluetooth, infrared, GPRS, GSM, CDMA, Z-Wave, ZigBee, LoRaWAN, another protocol, or a combination thereof.

Implementations of the computing device 1100 may differ from what is shown and described with respect to FIG. 11. In some implementations, the computing device 1100 can omit the peripherals 1110. In some implementations, the memory 1104 can be distributed across multiple devices. For example, the memory 1104 can include network-based memory or memory in multiple clients or servers performing the operations of those multiple devices. In some implementations, the application data 1118 can include functional programs that perform the techniques and processes described herein.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special-purpose processor or circuitry that may include specialized hardware for carrying out any of the methods, algorithms, aspects, or combinations thereof, as described herein. In some implementations, portions of the instructions may be distributed across multiple processors on a single device, or on multiple devices, which may communicate directly or across a network, such as a local area network, a wide area network, the Internet, or a combination thereof.

As used herein, the terminology "example," "embodiment," "implementation," "aspect," "feature," or "element" indicate serving as an example, instance, or illustration. Unless expressly indicated otherwise, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise or clearly indicated otherwise by the context, "X includes A or B" is intended to indicate any of the natural inclusive permutations thereof. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of operations or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and/or elements.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for trajectory planning, comprising:
   identifying state data based on sensor data from sensors of a vehicle;
   inputting the state data to a machine-learning model to obtain parameters of a trajectory planner, wherein the parameters of the trajectory planner comprise at least one of a target timing headway parameter or a target radial distance, and wherein the machine-learning model is trained using snippets of driving data from different vehicles to imitate driving behavior, such that output parameters are configured to adapt trajectory planning based on driving context;
   inputting the parameters to the trajectory planner to obtain a short term speed plan, wherein the short term speed plan comprises a sequence of positions and speeds for the vehicle based on the target timing headway parameter or the target radial distance; and
   autonomously controlling the vehicle according to at least a portion of the short term speed plan.

2. The method of claim 1, wherein the machine-learning model is trained using data samples extracted from the state data, and wherein each data sample constitutes a snippet having a predefined length.

3. The method of claim 1, wherein the state data comprises data related to at least two of localization data, data related to autonomous driving, or data related to perceived other road objects.

4. The method of claim 1, wherein the machine-learning model is trained using state data that meet a selection criterion.

5. The method of claim 4, further comprising:
   receiving a selection of the machine-learning model.

6. A device for trajectory planning, comprising:
   a processor; and
   a memory, the processor configured to execute instructions stored in the memory to:
      identify state data based on sensor data from sensors of a vehicle;
      input the state data to a machine-learning model to obtain parameters of a trajectory planner, wherein the parameters of the trajectory planner comprise at least one of a target timing headway parameter or a target radial distance, and wherein the machine-learning model is trained using snippets of driving data from different vehicles to imitate driving behavior, such that output parameters are configured to adapt trajectory planning based on driving context;
      input the parameters to the trajectory planner to obtain a short term speed plan, wherein the short term speed plan comprises a sequence of positions and speeds for the vehicle based on the target timing headway parameter or the target radial distance; and
      autonomously control the vehicle according to at least a portion of the short term speed plan.

7. The device of claim 6, wherein the machine-learning model is trained using data samples extracted from the state data, and wherein each data sample constitutes a snippet having a predefined length.

8. The device of claim 6, wherein the state data comprises data related to at least two of localization data, data related to autonomous driving, or data related to perceived other road objects.

9. The device of claim 6, wherein the machine-learning model is trained using state data that meet a selection criterion.

10. The device of claim 6, wherein the processor is further configured to execute instructions stored in the memory to:
    receive a selection of the machine-learning model.

11. A non-transitory computer-readable storage medium, comprising executable instructions that, when executed by a processor, cause performance of operations, comprising:
    identifying state data based on sensor data from sensors of a vehicle;
    inputting the state data to a machine-learning model to obtain parameters of a trajectory planner, wherein the parameters of the trajectory planner comprise at least one of a target timing headway parameter or a target radial distance, and wherein the machine-learning model is trained using snippets of driving data from different vehicles to imitate driving behavior, such that output parameters are configured to adapt trajectory planning based on driving context;

inputting the parameters to the trajectory planner to obtain a short term speed plan, wherein the short term speed plan comprises a sequence of positions and speeds for the vehicle based on the target timing headway parameter or the target radial distance; and autonomously controlling the vehicle according to at least a portion of the short term speed plan.

12. The non-transitory computer-readable storage medium of claim 11, wherein the machine-learning model is trained using data samples extracted from the state data, and wherein each data sample constitutes a snippet having a predefined length.

13. The non-transitory computer-readable storage medium of claim 11, wherein the state data comprises data related to at least two of localization data, data related to autonomous driving, or data related to perceived other road objects.

14. The non-transitory computer-readable storage medium of claim 11, wherein the machine-learning model is trained using state data that meet a selection criterion.

* * * * *